(12) United States Patent
Rothschild et al.

(10) Patent No.: US 11,910,265 B2
(45) Date of Patent: *Feb. 20, 2024

(54) HYPER-LOCALIZATION BASED EDGE-CONVERGED TELEMETRY

(71) Applicant: Cox Communications, Inc., Atlanta, GA (US)

(72) Inventors: Keith Alan Rothschild, Dunwoody, GA (US); Dipan Patel, Atlanta, GA (US); Ron Lev, Atlanta, GA (US); Steve Malenfant, Cumming, GA (US)

(73) Assignee: Cox Communications, Inc., Atlanta, GA (US)

( * ) Notice: Subject to any disclaimer, the term of this patent is extended or adjusted under 35 U.S.C. 154(b) by 490 days.

This patent is subject to a terminal disclaimer.

(21) Appl. No.: 17/026,973

(22) Filed: Sep. 21, 2020

(65) Prior Publication Data

US 2021/0067903 A1  Mar. 4, 2021

Related U.S. Application Data

(63) Continuation of application No. 16/558,612, filed on Sep. 3, 2019, now Pat. No. 10,791,421.

(51) Int. Cl.
| | |
|---|---|
| *H04W 4/21* | (2018.01) |
| *H04B 17/318* | (2015.01) |
| *G06F 16/29* | (2019.01) |
| *H04W 4/021* | (2018.01) |
| *G06F 16/9035* | (2019.01) |
| *H04W 8/20* | (2009.01) |

(Continued)

(52) U.S. Cl.
CPC ............. *H04W 4/021* (2013.01); *G06F 16/29* (2019.01); *G06F 16/9035* (2019.01); *H04B 17/318* (2015.01); *H04W 8/20* (2013.01); *H04W 84/18* (2013.01); *G06F 9/541* (2013.01)

(58) Field of Classification Search
None
See application file for complete search history.

(56) References Cited

U.S. PATENT DOCUMENTS

| 8,509,953 B2 | 8/2013 | Taft |
|---|---|---|
| 9,860,704 B2 | 1/2018 | Kapicioglu et al. |

(Continued)

*Primary Examiner* — Pablo N Tran
(74) *Attorney, Agent, or Firm* — Merchant & Gould P.C.

(57) ABSTRACT

Edge-converged telemetry is provided. A system, method, and computer readable storage device are provided for collecting telemetry data from a plurality of telemetry sources in an edge network, determining geolocations of the telemetry, tagging the telemetry with geolocation metadata corresponding to the determined geolocations, correlating telemetry based at least in part on the geolocation, converging the telemetry, and providing the edge-converged telemetry to a client decisioning system that is enabled to use the converged telemetry for making or influencing decisions made by the system. In an example aspect, the decisioning system is configured to make decisions for controlling a device, wherein the decisions are based at least in part on telemetry data. Accordingly, edge-converged telemetry enhance capabilities of the decisioning system by providing data that may have not been previously available to the system and/or by providing a more comprehensive representation of the environment in which the system is operating.

20 Claims, 11 Drawing Sheets

(51) Int. Cl.
*H04W 84/18* (2009.01)
*G06F 9/54* (2006.01)

(56) References Cited

U.S. PATENT DOCUMENTS

| | | | |
|---|---|---|---|
| 10,068,089 B1* | 9/2018 | Shavell | H04W 12/12 |
| 10,313,828 B1* | 6/2019 | Burcham | H04W 4/023 |
| 10,326,689 B2* | 6/2019 | Liu | H04W 40/16 |
| 10,791,421 B1 | 9/2020 | Rothschild et al. | |
| 11,374,807 B2* | 6/2022 | Kothuri | H04L 41/5058 |
| 2018/0262533 A1* | 9/2018 | McCaig | H04L 63/1441 |

* cited by examiner

HYPER-LOCALIZATION BASED EDGE-CONVERGED TELEMETRY

CROSS-REFERENCE TO RELATED APPLICATION

This application is a continuation of U.S. patent application Ser. No. 16/558,612, filed Sep. 3, 2019, now U.S. Pat. No. 10,791,421, which is incorporated by reference herein in its entirety.

BACKGROUND

Various systems, such as automation systems, utilize telemetry data to make or influence decisions for providing a variety of functionalities. For example, a home automation system may use outdoor temperature data to control operation of a heating and air conditioning unit or rainfall data to control operation of a sprinkler system. Telemetry data include information produced by sensors which can be useful for a device or service in order to make decisions on what actions to perform. Oftentimes, a client system may only have access to data produced by sensors on or connectively attached to the client. For example, some client systems may utilize data from sensors local to a small private network, such as a local area network at a consumer's premises to which the client is connected. The client system's ability to make informed decisions, with respect to the limited telemetry data available, may be not be optimized. For example, the information that the client system uses to make operational decisions may be constrained to a dataset gathered from a limited local area. Or, a client system may not have access to certain sensors, which further limits the client's ability to perform automated actions. Accordingly, functionalities of the client may be constrained, which can lead to inefficient operation of the client.

SUMMARY

Aspects of the present disclosure provide a system, method, and computer readable storage device for providing converged locally-relevant telemetry data. According to an aspect, telemetry data are collected from various telemetry sources, are correlated with other telemetry based on location, and are provided to client decisioning systems that are enabled to use the correlated telemetry for making or influencing decisions made by the systems. For example, a decisioning system may be configured to make decisions for controlling a device, wherein the decisions are based at least in part on local telemetry data. Accordingly, the correlated telemetry enhance capabilities of the decisioning system by providing data to the system that may have not been previously available to the system and/or by providing a more comprehensive representation of the environment in which the client system is operating.

According to an aspect, a telemetry convergence system is configured to collect telemetry data from a plurality of telemetry sources, including telemetry sources that are external to a client decisioning system's local network. For example, telemetry may be collected from sources proximate to the client, such as sensors and devices at neighboring premises, sensors and devices that are part of or connected to equipment deployed near the client by a Network Service Provider (NSP), telecommunications provider, utility service provider, weather service, or other entity. The telemetry convergence system is further configured to determine a geolocation of the telemetry, associate the geolocation with the data, and store the data such that the data can be accessed by various components of the telemetry convergence system. In an example aspect, the geolocation may be determined by determining the geolocation of network elements through which the telemetry traffic are transmitted, and associating this network element geolocation with the telemetry. The telemetry convergence system may further be configured to analyze and process the collected telemetry, for example, for one or a combination of: correlating local data points, making predictions, transforming data, filtering data, converging data, and determining which data are relevant to the client decisioning system based at least in part on the geolocation associated with the data. Relevancy can additionally be based on the type of telemetry data and the type of client (e.g., service, device, decisions made by the service) receiving the data.

In some examples, the data are published to one or more queues based on a set of criteria, wherein a client decisioning system may subscribe to receive data published to the one or more queues. In other examples, the client decisioning system may query the telemetry convergence system for telemetry that are locally-relevant to the client based on a decision being made by the client. Prior to transmitting locally-converged telemetry to a client decisioning system, the data may be anonymized.

According to an aspect, telemetry data provided to a client decisioning system may be truncated, such that telemetry data that are determined to be locally-relevant to the client are transmitted to the client, while data that are determined as not locally-relevant to the client are not transmitted to the client. As can be appreciated, receiving fewer data transmissions comprised of correlated relevant telemetry can improve the efficiency of the client's processing and memory resources. Further, by collecting and providing telemetry data that are sourced from outside the client's local network, the client decisioning system is provided with an increased amount of relevant data that enables the client to make decisions off an extended and more comprehensive representation of the environment in which the client is operating. For example, the criteria that the client bases decisions on may be related to attributes of the client's operating environment. Accordingly, this extended and more comprehensive view of the client's operating environment can improve the decision-making functionalities of the client for operating more efficiently and with improved performance. For example, telemetry data collected from telemetry sources external to a client decisioning system's local network may provide the client with information produced by sensors to which the client may not have access and/or may provide the client with information about certain conditions in a wider area. The client decisioning system may be enabled to detect events that may affect the client sooner, even before the client's near-range environment may be affected to those conditions. This may allow the client to respond to these events more quickly. Moreover, fewer devices and sensors may be needed at a user's premises and throughout an area due to the availability of telemetry data from various sources within the area that can be shared amongst various clients. As an example, a single weather station deployed in a neighborhood may be utilized by the telemetry convergence system to provide a plurality of client decisioning systems within the neighborhood with weather-related data that the clients can use for automatically controlling various devices (e.g., sprinkler systems, automated blinds, storm shutters, heating and air conditioning units, humidifiers, dehumidifiers).

The details of one or more aspects are set forth in the accompanying drawings and description below. Other features and advantages will be apparent from a reading of the following detailed description and a review of the associated drawings. It is to be understood that the following detailed description is explanatory only and is not restrictive of the present disclosure.

BRIEF DESCRIPTION OF THE DRAWINGS

Further features, aspects, and advantages of the present disclosure will become better understood by reference to the following figures, wherein like reference numbers indicate like elements throughout the several views.

DETAILED DESCRIPTION

Figure 1:
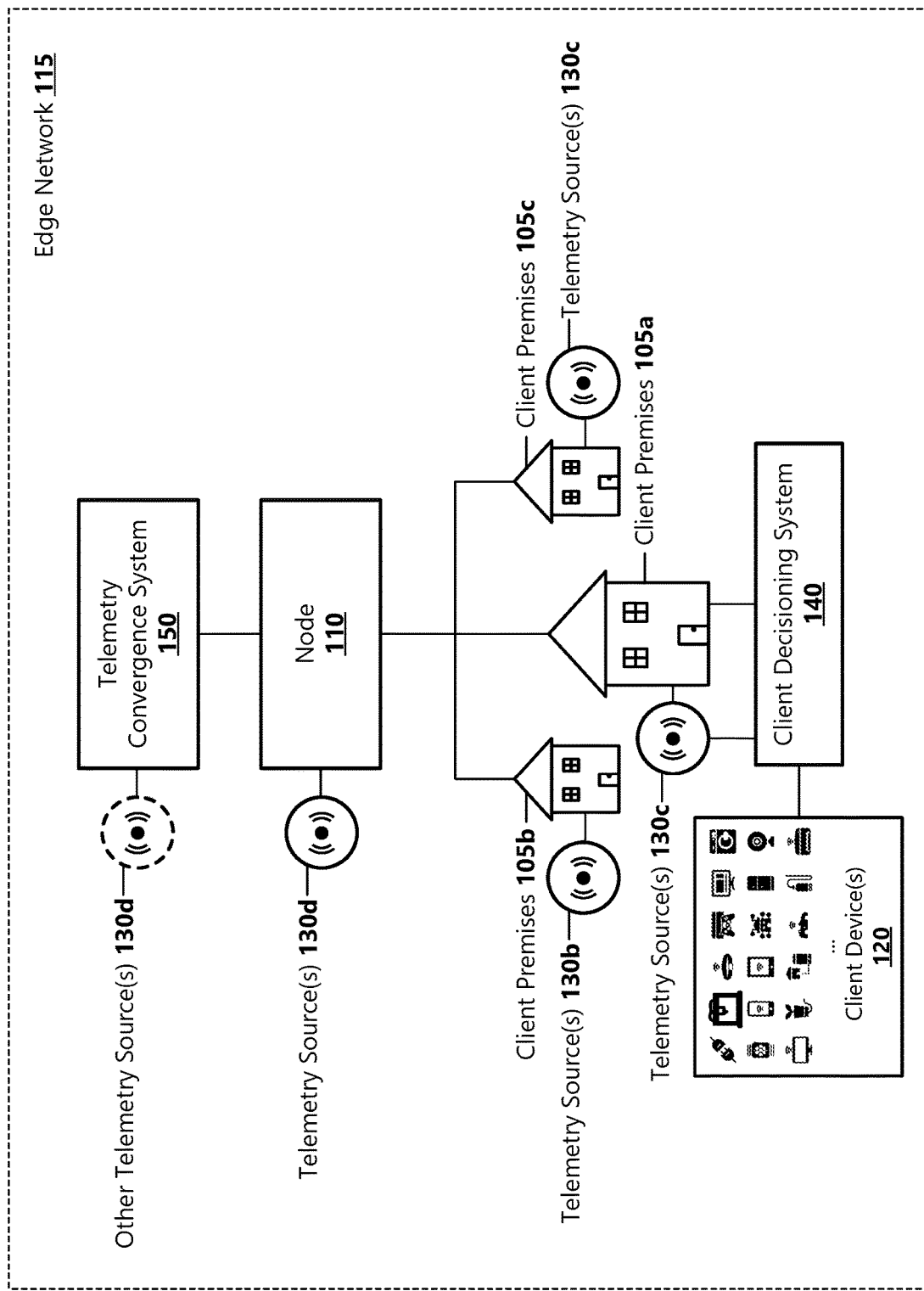
FIG. 1 is a block diagram depicting an example operating environment in which aspects of a telemetry convergence system may be implemented.

Aspects of the present disclosure provide a technical improvement to providing telemetry data to client systems that are configured to make decisions for controlling one or more devices based at least in part on telemetry data. FIG. 1 shows an example localized edge-converged telemetry operating environment 100 in which hyper-localization based edge-converged telemetry functionalities can be practiced. For example, the localized edge-converged telemetry operating environment 100 is an example operating environment in which a system comprising a telemetry convergence system 150 can be implemented for collecting telemetry data, analyzing the telemetry data for determining which telemetry are relevant to and can be consumed by clients within a defined geographical area, and providing the relevant telemetry to those clients.

According to an aspect, the localized edge-converged telemetry operating environment 100 may be implemented in an edge network 115, wherein an edge network may describe a network located on the periphery of a centralized network, such as the Internet. For example, an edge network 115 may be provided by a network service provider (NSP), and may connect subscribers to a centralized network or other networks. An edge network 115 may comprise various network nodes 110 that serve as a connection point that can receive, create, store, or send data along distributed network routes. For example, a network node 110 may include various electronic, optical, or wireless technology network components that may recognize, process, and forward transmissions of data to other network nodes. Examples of network nodes 110 include, but are not limited to, regional level routers, edge routers, data centers, cell towers, optical nodes, hubs, base stations, base station controllers, etc. Further information on example network architectures can be found in FIGS. 8 and 9. According to an aspect, the edge network 115 may serve to connect telemetry sources 130 and client decisioning systems 140a-n (collectively 140) to the telemetry convergence system 150.

As used herein, telemetry data (sometimes referred to herein as telemetry) include environmental or device data that are recorded by various telemetry sources 130a-n (collectively 130) and that are accessed by a central computing system (i.e., the telemetry convergence system 150) for analysis, processing, and convergence with other local telemetry. The telemetry sources 130 may include a variety of sensors configured to measure or record information about certain conditions in an environment or about certain events detected by the sources. Some non-limiting example telemetry sources 130 may include thermometers, rain gauges, air quality monitors, cameras, weather stations, ambient light sensors, barometric pressure sensors, humidity sensors, dew point sensors, wind speed and direction sensors, lightning sensors, ultraviolet light index sensors, etc. Other types of sensors are possible and are within the scope of the present disclosure.

In some examples, a telemetry source 130 may be implemented at a subscriber residence or premises 105a-n (generally 105). For example, various sensors may be installed at a premises 105 that provide telemetry to a local decisioning system 140 (e.g., security system, home automation system, irrigation system) or that publish telemetry to third-party systems. In other examples, telemetry sources 130 may be implemented on NSP equipment, devices, or other infrastructure (i.e., network nodes 110) located in a NSP network. As an example, a network node 110 may include a telemetry source 130d embodied as a temperature sensor configured to monitor the temperature of the node and/or the ambient temperature around the node. In other examples, other entities, such as utility service providers, weather services, municipalities, homeowners or neighborhood associations, etc., may deploy sensors at various locations that serve as telemetry sources 130.

In some examples, an owner of a telemetry source 130 may register their sensors with the telemetry convergence system 150 for publishing telemetry generated by the sensors to the telemetry convergence system 150. As part of registering a telemetry source 130 to push telemetry to the telemetry convergence system 150, the telemetry source may be configured to communicate with the telemetry convergence system via an application programming interface (API) provided by the telemetry convergence system. For example, the telemetry source 130 may use the API to publish telemetry data to the telemetry convergence system 150. According to an example aspect, telemetry provided by telemetry sources 130 may be in a variety of formats and use various communication protocols (e.g., HTTPS (Hypertext Transfer Protocol Secure), MQTT (Message Queuing Telemetry Transport), CoAP (Constrained Application Protocol), LoRaWAN® (Low Power Wide Area (LPWA networking)). In some examples, telemetry provided by a telemetry source 130 may include unencrypted data that may be published for free use. In other examples, telemetry provided by a telemetry source 130 may include encrypted private data that an owner of the source consents to share with the telemetry convergence system 150 (e.g., directly or via a third-party platform).

In example aspects, the telemetry convergence system 150 may be configured to subscribe to telemetry data feeds from a third-party platform, wherein the telemetry data feeds may include telemetry data provided by a plurality of telemetry sources 130. The telemetry convergence system 150 may access telemetry data provided by the third-party platform by requesting the data via an API call. Telemetry transmitted to the telemetry convergence system 150 may be in the form of a message or data file that may include addressing information, a timestamp, and encrypted or unencrypted telemetry data. A telemetry data packet may further include various attributes, such as but not limited to, an identifier of the telemetry source 130 (e.g., a router name or export IP address), an identifier of the sensor(s), an identifier of the telemetry data type, etc.

In some examples, as part of registering a telemetry source 130 with the telemetry convergence system 150 or with a third-party platform, the owner may consent to allow location information to be collected from the telemetry source 130 or from a network device (e.g., modem) that connects the telemetry source to the provider's access network and to be shared with published telemetry data. In other examples, as part of registering a telemetry source 130 with the telemetry convergence system 150 or a third-party platform, the owner may manually provide location information that may be included with published telemetry data. In other example, the owner may consent to share telemetry for public use after the data are anonymized. According to an aspect and as will be described in further detail below, location information may be determined by the telemetry convergence system 150 based on network topography. According to an aspect, transmissions of telemetry data from a telemetry source 130 to a network node 110 may be made via wired and/or wireless means.

As will be described in further detail below, the telemetry convergence system 150 is configured to receive telemetry data provided by various telemetry sources 130, determine a geolocation of the telemetry, associate geolocation metadata with the telemetry, analyze the data for correlating telemetry with other local data points, converge telemetry based at least in part on the geolocation metadata, make predictions based on the telemetry, and/or provide the data to client decisioning systems 140 (also referred to herein as clients or client systems) as input data for automatically controlling processes or operations of various client devices 120 or systems. For example, a client decisioning system 140 may consume edge-converged telemetry it receives and act on the data to effectuate a process or functionality of a client device 120 (e.g., a heating, ventilation, and air-conditioning (HVAC) system, lights, sprinklers, a security system, a camera, blinds, shutters, a humidifier, a dehumidifier, an alarm, door locks).

In example aspects, a client decisioning system 140 may include a controller component illustrative of a software application, module, or computing device operable or configured to regulate or control the performance or operation of a client device 120 or system. For example, a controller may be configured to control performance or operation of a variety of devices 120 or systems, such as mechanical systems, electrical systems, plumbing systems, irrigations systems, heating, ventilation, and air-conditioning systems, lighting systems, security systems, surveillance systems, data backup and restore services, digital assistant services, etc. In some examples, a client decisioning system 140 may be located remotely from the device 120 that it may control. For example, a client decisioning system 140 may be hosted on computing resource located at a client premises 105, such as a personal computer, personal server; or, the client decisioning system 140 may be implemented as a virtual service on an enterprise resource, such as on an edge router, data center, or other resource in the edge network 115.

As stated above, telemetry are collected from a plurality of telemetry sources 130 located throughout the edge network 115. As can be appreciated, when locally-relevant telemetry are converged, the data provided to client decisioning systems 140 can provide the client with an extended and more comprehensive representation of the environment in which the client is operating. For example, the criteria that the client decisioning system 140 bases decisions on may be related to attributes of the client's operating environment. Accordingly, this extended and more comprehensive view of the client's operating environment can improve the decision-making functionalities of the client decisioning system 140 for operating more efficiently (e.g., fewer local sensors may be required) and with improved performance (e.g., certain environmental conditions may be sensed earlier, allowing for the automation system to respond more quickly).

Figure 2:
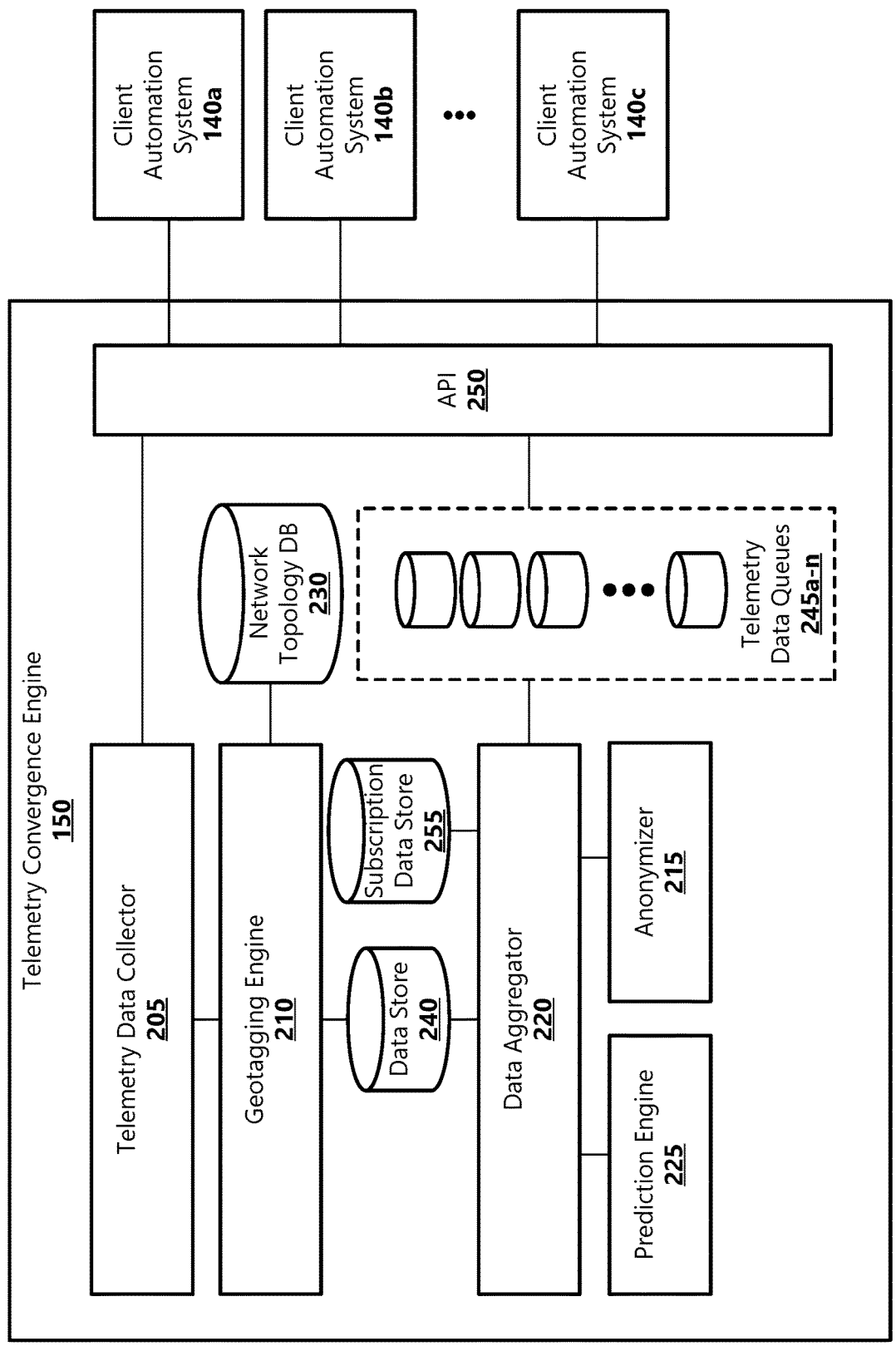
FIG. 2 is a block diagram depicting example components of the telemetry convergence system.

FIG. 2 shows a block diagram depicting components of an example telemetry convergence system 150. According to an aspect, the telemetry convergence system 150 comprises a telemetry data collector 205, a geotagging engine 210, a network topology database 230, a data aggregator 220, a subscription data base 255, a prediction engine 225, an anonymizer 215, a data store 240 (e.g., a data lake), an API 250, and optional telemetry data queues 245a-n (generally 245). The telemetry data collector 205 is illustrative of a software application, module, or computing device operable or configured to receive telemetry data supplied by a plurality of telemetry sources 130. In an example aspect, a telemetry source 130 may be preconfigured to share telemetry with the telemetry convergence system 150 (e.g., directly with the telemetry convergence system 150 or via a third-party platform). For example, a telemetry source 130 may be preconfigured to share telemetry with the telemetry convergence system 150 via registering the telemetry source 130 as a content provider to the telemetry convergence system or the third-party platform. As part of registering a telemetry source 130, information about the source (e.g., sensor type, source identifier) may be provided to the telemetry convergence system or the third-party platform. Additionally, an owner of the telemetry source may consent to share the telemetry data, and in some examples, consent to share location information associated with the telemetry data.

Telemetry sources 130 may be configured to provide telemetry data to the telemetry data collector 205 and the telemetry data collector may be configured to receive telemetry data from telemetry sources via various types of interfaces and protocols (e.g., an API, a standards-based protocol (e.g., SNMP), a proprietary protocol (e.g., bit-mapped or REST-(REpresentational State Transfer) based interaction, via a message bus, queuing service, a pub-sub service, in a single field, in a JSON payload, etc. In some examples, telemetry data transmitted to the telemetry data collector 205 may include a timestamp. In other examples, the telemetry data collector 205 may assign a timestamp to the telemetry data when the data are received.

In some examples, telemetry data may be pushed by a telemetry source 130 to the telemetry data collector 205. For example, a telemetry source 130 may transmit telemetry data to the telemetry data collector 205 when the data are sensed or collected (e.g., in real time or near-real time) or based on an event threshold. Depending on how the telemetry source 130 is configured, telemetry data may be collected by the telemetry source 130 periodically or responsive to a triggering event. In other examples, telemetry data may be pulled from a telemetry source 130. For example, the telemetry data collector 205 may request telemetry data from a telemetry source 130, and the telemetry source may transmit the requested data to the telemetry data collector as a response. The request may be a periodic request, or the telemetry data collector 205 may request telemetry data from one or more telemetry sources 130 in response to a request for edge-converged telemetry from a client decisioning system 140. For example, when a client decisioning system 140 makes a decision, the client may be configured to request edge-converged telemetry from the client decisioning system 140. The client decisioning system 140 may access stored telemetry, or the system may query one or more local telemetry sources 130 for telemetry. According to an example aspect, the telemetry data collector 205 may be configured to pass received telemetry data to the geotagging engine 210 for determining a geolocation of the telemetry and associating geolocation metadata with the data.

The geotagging engine 210 is illustrative of a software application, module, or computing device operable or configured to determine where received telemetry are originated, and to apply geolocation metadata (sometimes referred to as geolocation tags or geotags) to the telemetry data. According to an example aspect, the geolocation metadata identify a geolocation corresponding to the source of the telemetry data. The geolocation metadata can be used by the system for determining whether the associated telemetry data are locally relevant to a particular client decisioning system 140. The geolocation metadata may include latitude and longitude coordinates of an exact location of the telemetry source 130 or may include an identifier associated with a generalized location of the telemetry source (e.g., a neighborhood or an area serviced by a particular network node 110). In some examples, such as when a telemetry source 130 is static, the telemetry source may have an identified geo-location. In other examples, such as when a telemetry source 130 is mobile, the telemetry source may provide a geo-location. The geo-location may be provided with the telemetry data that is sent to the telemetry convergence system 150, or may be correlated later based on an identifier associated with the telemetry source 130 and a time-date stamp, and a later geolocation of the source can be tied to data sent from that source at that time.

In some examples, geolocation-tagging of telemetry data assigns a geotag to a received telemetry data packet based on a known physical location of the network node 110 through which the telemetry source 130 transmitting the telemetry is communicatively connected. For example, the telemetry convergence system 150 may be implemented by a NSP, and the geotagging engine 210 may be configured to inspect telemetry data packets that are sent from the telemetry source 130 through the NSP network (e.g., edge network 115). In some examples, inspection of telemetry data packets may include a shallow packet inspection that identifies network addressing information included in the data packet. For example, the network addressing information may be included in a header portion of a telemetry data packet, and may identify source and destination nodes made by the telemetry data packet as the data are transferred from the telemetry source 130 on the NSP network.

According to an aspect, the geotagging engine 210 may be configured to access a network topology database 230 that is included in or communicatively connected to the telemetry convergence system 150, wherein the network topology database may be configured to store physical network topology information, such as information about the physical connections in the NSP network 115 and how end devices and infrastructure devices/network nodes 110 (e.g., routers, switches, wireless access points) are interconnected. Information about network nodes 110 stored in the network topology database 230 may include network node addressing information and geolocations (e.g., latitude and longitude) of the network nodes. The geotagging engine 210 may query the network topology database 230 for determining the geolocation of a network node 110 or client router identified as a source node in the telemetry data packet.

In various examples, advertised geolocations of the network nodes 110 may be incorrect. As an example, a link (network node 110) may be published as being in France and owned by a French telecommunications company; however, it may be observed that it may take less than 10 ms for a data transmission to go through that hop on a path from Los Angeles to Dallas. Therefore, it may be determined that the link or node 110 cannot be in France, and is likely passing through a gateway associated with (e.g., possibly owned and operated by) that telecommunications company. Accordingly, in another example aspect, such as in a wireless communication scenario, the geotagging engine 210 may be configured to determine the geolocation of a telemetry source 130 using GPS triangulation, cell tower triangulation, WI-FI positioning, and/or other known pinpointing methods. For example, the geolocation of a telemetry source 130 can be determined based on known geolocations of network nodes 110 (e.g., cell towers, wireless access points) and signal strength data and/or ping data provided by the node. For example, a telemetry source 130 may communicate wirelessly via a cellular network. The telemetry source's communication signal may be picked up by a plurality of cell towers. Based on known geolocations of the cell towers that receive the source's signal, the distance of the telemetry source 130 from each cell tower can be estimated based on lag time between when the tower sends a ping to the source and receives an answering ping back and/or based on the source's signal strength. As another example, a telemetry source 130 may be configured to seek WI-FI access points. By identifying the WI-FI access points that the telemetry source 130 is within range of and the strength of the WI-FI signals that the source is receiving, and based on knowledge of the geolocations of the WI-FI access points (e.g., stored in the network topology database 230 or accessing the geolocations of the WI-FI access points via an API interfacing a third-party system), a determination may be made as to the source's geolocation.

In another example aspect, the geolocation of telemetry may be provided by the telemetry source 130. For example, location information may be manually or automatically assigned to the telemetry source 130, or may be determined and provided by a GPS or other location determining system included in or coupled with the telemetry source, by a client network device, such as a modem at a client premises 105, or the like.

The geotagging engine 210 may be further configured to attach the determined geolocation to the telemetry data as metadata. For example, the geotagging engine 210 may attach a geotag or geolocation tag to a telemetry data packet. The geotagging engine 210 may be further configured to store geotagged telemetry in a data store 240 where the data may be accessed by other components of the telemetry convergence system 150. In various implementations, the data store 240 may be configured as a data lake that may store structured, unstructured, and/or hybrid data. For example, a data store 240 configured as a data lake may store data in its native format, wherein the data may be accessed by other components for analysis and processing.

The data aggregator 220 is illustrative of a software application, module, or computing device operable or configured to correlate and converge telemetry based on various data attributes, process telemetry data (e.g., aggregate, transform, filter, join), make predictions based on historical data, anonymize the data, and provide relevant edge-converged telemetry data to one or more client decisioning systems 140. According to an aspect, relevance of telemetry data may be based on geographic location and telemetry data type, and may be associated with a decision that the client decisioning system 140 is configured to make based on telemetry. Relevance may additionally be based on the time of collection of the telemetry data.

In various example aspects, the data aggregator 220 may include or be communicatively attached to a prediction engine 225 illustrative of a software application, module, or computing device operable or configured to perform predictive analytics as part of providing relevant data to client decisioning systems 140. According to an example, the prediction engine 225 may be embodied as a machine learning model that is trained with historical data that can be used by the data aggregator 220. For example, predictive analytics may be utilized to calculate the probability that an event will occur within a specific timeframe and/or within a specific area based on historical data. An example event may include a weather-related event. Another example event may include a security-related event. The prediction engine 225 may be configured to analyze certain telemetry data types based on the predictions being determined. When an event is predicted, the data aggregator 220 may be configured to determine which client decisioning systems 140 the predicted event may be relevant to, and to raise an alert to those clients. In example aspects, relevance may correspond to geolocation. Determining which clients to alert may be based on subscription settings, where a client decisioning system 140 may subscribe to receiving alerts for certain types of events that are predicted at a particular location, within a particular area, or if the prediction includes a predicted path or area that affects the client. Based on various configurations, the alert and/or telemetry data may be pushed to the client decisioning system 140 or pulled by the client, which informs the client of the predicted event and enables the client to respond. In an example aspect, receiving an alert corresponding to a predicted event can enable the client decisioning system 140 to proactively take some sort of action or corrective action (e.g., prior to the event occurring, to mitigate risk, for providing a functionality). As can be appreciated alerting clients of events that are predicted based on telemetry data collected from a wider area (e.g., an area that is more extensive than the client's premises) can enable clients to respond to events more quickly.

One example weather-related event that the prediction engine 225 may predict may include a rainfall prediction. For example, based on rainfall telemetry data collected and provided to the telemetry convergence system 150 by one or more telemetry sources 130, the prediction engine 225 may be operable to predict that rainfall is likely within a particular area. Moreover, a client decisioning system 140 may be located within the particular area and may subscribe to receiving telemetry and/or alerts of predicted rainfall events. Accordingly, the data aggregator 220 may publish the prediction and/or telemetry data to a particular queue 245 that the client decisioning system 140 may pull telemetry from and/or the data aggregator may push a notification to the client decisioning system 140. For example, based on the prediction, the client decisioning system 140 may determine to cancel or postpone turning on sprinklers even if rainfall data at the client premises indicates that there is no rainfall.

In another example, the prediction engine 225 may predict a change in ambient air temperature based on telemetry data collected from one or more telemetry sources 130. For example, based on temperature data collected from one or more telemetry sources 130, such as a weather station located at a network node 110, the prediction engine 225 may predict that the ambient air temperature at a client premises 105 may rise rapidly. The corresponding telemetry data and/or a notification of the predicted event (e.g., rise in temperature) may be provided to the client decisioning systems 140. For example, a client decisioning system 140 that controls a smart thermostat may receive the data/notification and may be enabled to turn on an air conditioning system to start cooling the client premises 105 prior to the rise in air temperature at the premises.

According to an aspect, the data aggregator 220 is operable or configured to truncate telemetry data. For example, based at least in part on defined subscription attributes, specific telemetry data may be transmitted to client decisioning systems 140. That is, telemetry collected from various telemetry sources 130 in the edge network 115 are truncated by the data aggregator 220 such that data that are not of a specific requested type or that are not proximate or locally-relevant to a client decisioning system 140 are not published the that client's telemetry data queue 245 and are not transmitted to the client. Moreover, prior to transmitting telemetry to a client decisioning system 140, the data aggregator 220 may be further operable or configured to set a Time to Live (TTL) value to telemetry data to expire data that may no longer be relevant to the client and minimize the storage of non-relevant data. According to an example aspect, the TTL value may be set based on the data type and/or parameters defined in subscription settings. For example, temperature data that a client decisioning system 140 may use for automating operation of an HVAC unit may expire after a certain defined time period (e.g., thirty minutes, one hour, six hours), wherein another telemetry data type (e.g., rainfall data) may expire after a different defined time period (e.g., twelve hours, one day).

According to an aspect, prior to transmitting telemetry data to a client decisioning system 140, the data may be anonymized to protect the identity/privacy of the telemetry source 130 and its owner. The anonymizer 215 is illustrative of a software application, module, or computing device operable or configured to anonymize the collected telemetry data. According to an example aspect, before the telemetry data are sent to a client, the data aggregator 220 may utilize the anonymizer 215 to remove personal identifying information associated with the telemetry data, while preserving other metadata, such as the geolocation metadata. As part of anonymizing telemetry data, the anonymizer 215 may utilize standard anonymization practices, such as attribute suppression, record suppression, character masking, pseudonymization, generalization, swapping, data perturbation, and the like.

According to one embodiment, a client decisioning system 140 may be configured to pull relevant edge-converged telemetry from the telemetry convergence system 150. For example, periodically or as part of making a decision to control an automation action or functionality, the client decisioning system 140 may transmit a request to the data aggregator 220 for edge-converged telemetry, wherein the request may be a query for telemetry that meet certain criteria (e.g., location, data type, age). That is, in some examples, when the client decisioning system 140 makes a decision to perform or not perform an action, the client may query the telemetry convergence system 150 for edge-converged telemetry data relevant to that decision. In an example aspect, the telemetry convergence system 150 may expose an API 250 that the client decisioning system 140 can use for interfacing the telemetry convergence system for requesting edge-converged telemetry. For example, a request communicated to the telemetry convergence system 150 via the API 250 may query the data aggregator 220 for edge-converged telemetry that meet certain criteria.

In some examples, in response to a query, the data aggregator 220 may be configured to request telemetry from one or more telemetry sources 130 proximate to the requesting client decisioning system 140 based on known geolocations of the telemetry sources. For example, the geolocation of the client decisioning system 140 and geolocations of telemetry sources 130 may be stored in the network topology database 230, which the data aggregator 220 may access for determining from which telemetry sources to request telemetry data. A degree of proximity may be configurable. For example, proximate telemetry may include telemetry collected from a telemetry source 130 next door to a client premises 105 served by the requesting client decisioning system 140, a telemetry source in a same neighborhood as the client premises a telemetry source that communicates through a same node 110 as the client, and/or a telemetry source that is within the same edge network 115 as the client.

In other examples, in response to a query, the data aggregator 220 may be configured to access geotagged telemetry stored in the data store 240 for determining relevant telemetry to transmit to the requesting client decisioning system 140. For example, the data aggregator 220 may use a known geolocation of the client decisioning system 140 (e.g., stored in network topology database 230), and may query the data store 240 for telemetry that are proximate (e.g., within a defined range) to the location of the client based on the geolocation metadata. As mentioned above, the degree of proximity may be configurable. In some implementations, proximity may be defined as locations within a defined area or radius. In some implementations, proximity may be dependent on the decision being made by the client decisioning system 140. For example, if rain is detected within As another example, if a decision that needs to be made is within 10 ms of accuracy and the telemetry data from the telemetry source 130 generally has 50 ms of jitter, that telemetry data may not be used; however if 100 ms of accuracy is allowable, telemetry data associated with a measurement is within 50 ms of accuracy, then that telemetry data may be used. Based on the decision being made by the client decisioning system 140, telemetry of a specific type and telemetry within a certain geographic distance from the client premises 105 may be specified (e.g., as criteria in the query or in subscription settings). According to an aspect, as part of requesting telemetry from a telemetry source 130 or as part of querying the data store 240 for relevant telemetry to provide to a requesting client decisioning system 140, the data aggregator 220 may be configured to request a telemetry source or query the data store for a certain type of telemetry data (e.g., temperature data, humidity data, rain data).

In various example aspects, the data aggregator 220 may be further configured to process telemetry according to various data processing operations, which can provide various advantages, such as increased data transfer speeds, increased data access speeds, reduced storage requirements, and providing enhanced or modified data to a client decisioning system 140 that may enhance capabilities of the client. For example, such advantages can help to improve the operations of the client, such as enabling the client decisioning system 140 to control a client device 120 based on telemetry that the client may not have had access to previously. For example, a client premises 105 that uses a client decisioning system 140 to control operation of a client sprinkler system may not include a rain sensor. Accordingly, the client decisioning system 140 may have previously controlled the sprinkler system based only on a timer. When the client decisioning system 140 uses aspects of the present disclosure to access edge-converged telemetry that may be processed by one or more data aggregator processing operations, the client decisioning system may be enabled to control the sprinkler system based on time and rainfall amounts. Accordingly, the client decisioning system 140 and client devices 120 (e.g., sprinkler system) may operate more efficiently, which can lead to reduced costs and improved performance of the client and a better user experience for the user of the client. Various example data processing operations are described below with reference to FIG. 3.

According to another embodiment, proactively (e.g., periodically or continually as telemetry are received), the data aggregator 220 may be configured to analyze geo-tagged telemetry stored in the data store 240, correlate and converge telemetry based on geolocation, and publish the edge-converged telemetry data to one or more data queues 245 to which a client decisioning system 140 may subscribe. In some examples, when a client decisioning system 140 subscribes to a telemetry data queue 245 (e.g., such as in a pub/sub environment), the data aggregator 220 may be configured to push edge-converged telemetry stored in that queue to the client decisioning system. For example, the transmission of telemetry data to a client decisioning system 140 may occur when the data are published to the queue (e.g., when data that meet certain location and data type criteria are available to provide to the client). Or, according to another example, the transmission of edge-converged telemetry to a client decisioning system 140 may occur on a periodic basis (e.g., every minute, ten minutes, one hour, twelve hours). Or, according to another example, the transmission of edge-converged telemetry to a client decisioning system 140 may occur in response to a client request for edge-converged telemetry.

In other examples, a client decisioning system 140 may be configured to pull relevant edge-converged telemetry from the telemetry convergence system 150. For example, the client decisioning system 140 may be configured to receive edge-converged telemetry from the telemetry convergence system 150 via subscribing to one or more telemetry data queues 245a-n (generally 245). As an example, a user may register a client decisioning system 140 as a subscriber to receive edge-converged telemetry, wherein subscription settings may define certain telemetry criteria or attributes (e.g., location, telemetry data type, age of data). For example, the client decisioning system 140 can be configured to create a subscription with the telemetry convergence system 150, wherein the subscription may define the criteria/attributes of telemetry that the client decisioning system 140 may need for making one or more automation decisions. That is, a client decisioning system 140 may subscribe to receive certain types of telemetry (e.g., temperature data, rainfall data, humidity level data, electrical interference data, wind speed/direction data, motion data, and/or an aggregation of one or more types) that are provided by telemetry sources 130 that are proximate to the client (e.g., within a certain geographical distance from the client, within a certain geographical area that includes the client) and that may be correlated with other telemetry collected from telemetry sources proximate to the client.

As described above, proximity may be configurable and may be dependent on a decision made by or an automated function provided by the client decisioning system 140. In some examples, a subscription may define a particular telemetry source 130 from which a client decisioning system 140 may want to receive telemetry data. In other examples, a subscription may further define how a client decisioning system 140 may receive telemetry data (e.g., push, pull, frequency, notification of events or alerts). Subscription settings associated with a client decisioning system 140 may be stored in a subscription data store 255 where the subscription settings may be accessed by the data aggregator 220 for determining which telemetry to publish to a queue 245 and for determining which telemetry data points that may be correlated with other telemetry data points. In other example, criteria defining the telemetry that a client decisioning system 140 may be defined in a request for the data. In an example aspect, the client decisioning system 140 is configured to expose an API 250 that a client decisioning system 140 can use to make an API call to request certain attributes of telemetry data or to request telemetry data published to the system's telemetry data queue 245.

When the telemetry convergence system 150 receives telemetry data, the data aggregator 220 may be operable or configured to analyze the telemetry data to determine whether there is a subscription that matches attributes of the received data (e.g., by analyzing the geolocation metadata, data type, sensor type, timestamp). For a matching subscription, the data aggregator 220 may publish the telemetry data in the subscriber's (i.e., the client decisioning system's 140) telemetry data queue 245. In some examples, the data aggregator 220 may be configured as a rules engine that evaluates telemetry data based on a set of rules (e.g., subscription rules) corresponding to the defined attributes, and executes an action (e.g., publish telemetry data to a subscriber's telemetry data queue 245) when certain conditions are met. For example, a configurable set of rules can be stored based on the subscription settings, which may include a rule to evaluate attributes (e.g., geolocation metadata and/or, telemetry data type) associated with a telemetry data item; and if the attributes are associated with a particular geographic area, telemetry data type, etc., the telemetry data item may be stored in a specific data queue 245.

According to an example aspect, a particular telemetry data queue 245 may be associated with a particular decision that a client decisioning system 140 is configured to make or a particular condition or conditions that the client is configured to monitor. For example, a particular client decisioning system 140 may be embodied as an automated sprinkler system that is configured to make a decision about whether to turn on based on an amount of rainfall. Accordingly, the particular client decisioning system 140 may subscribe to a particular telemetry data queue 245 to which the data aggregator 220 publishes rainfall data collected from one or more telemetry sources 130 proximate and/or otherwise relevant to the client (e.g., in the client's neighborhood or surrounding area, connected to a same node 110 as the client, in the edge network 115). In some examples, a decision may be based on the proximity of the telemetry source 130. For example, if rainfall is detected within 5 miles of a client, but not within 1 mile, the client decisioning system 140 may be configured to delay turning on the automated sprinkler system. Alternatively, if rainfall is detected within 1 mile in multiple directions of the client, the client decisioning system may be configured to treat the rainfall data the same as a local rain detection system (e.g., determine it is raining and make a decision to not water).

As another example, a particular client decisioning system 140 may be embodied as a security system that may be configured to make a decision about whether to turn on one or more security cameras or automatically lock doors based on detected motion or nearby security events/alerts. For example, a security camera and/or home alarm may be triggered by a motion sensor at a first client premises 105b. Based on the data type and geolocation metadata, telemetry corresponding to the detected motion, and in some implementations, an alert or notification of the security event (e.g., security camera trigger event), may be published to a particular queue 245. A client decisioning system 140a associated with a second client premises 105a that may be a next-door neighbor of the first premises 105b or located in the same neighborhood as the first premises may subscribe to the particular telemetry data queue 245 to which locally-relevant motion sensor data and/or security events/alerts are published. Accordingly, the data and/or alert associated with the security event at the first premises 105b may be pushed to or pulled by the client decisioning system 140b at the second premises 105a. Based at least in part on data/alerts published to the queue 245, the client decisioning system 140b at the second premises 105b may make a decision about whether to turn on security devices (e.g., cameras, lights, alarms, locks) at the second premises. A third client premises 105c may comprise a client decisioning system 140c configured as a security system that also subscribes to edge-converged motion sensor data and/or security events/alerts. However, based on the location of the third premises 105c (e.g., determined by geolocation metadata), the data and/or alert associated with the security event at the first premises 105b may be determined to not be locally-relevant to the client decisioning system 140c at the third premises 105c (e.g., based on subscription settings or query criteria). For example, the first premises 105b may be outside of an area defined as proximate to the third premises 105c for security telemetry data (e.g., security data collected at the first premises 105b. Accordingly, the data and/or alert associated with the security event at the first premises 105b may not be published to a queue 245 to which the third client decisioning system 140c subscribes, and thus may not be provided the motion sensor telemetry data and/or security event/alert data.

Figure 3:
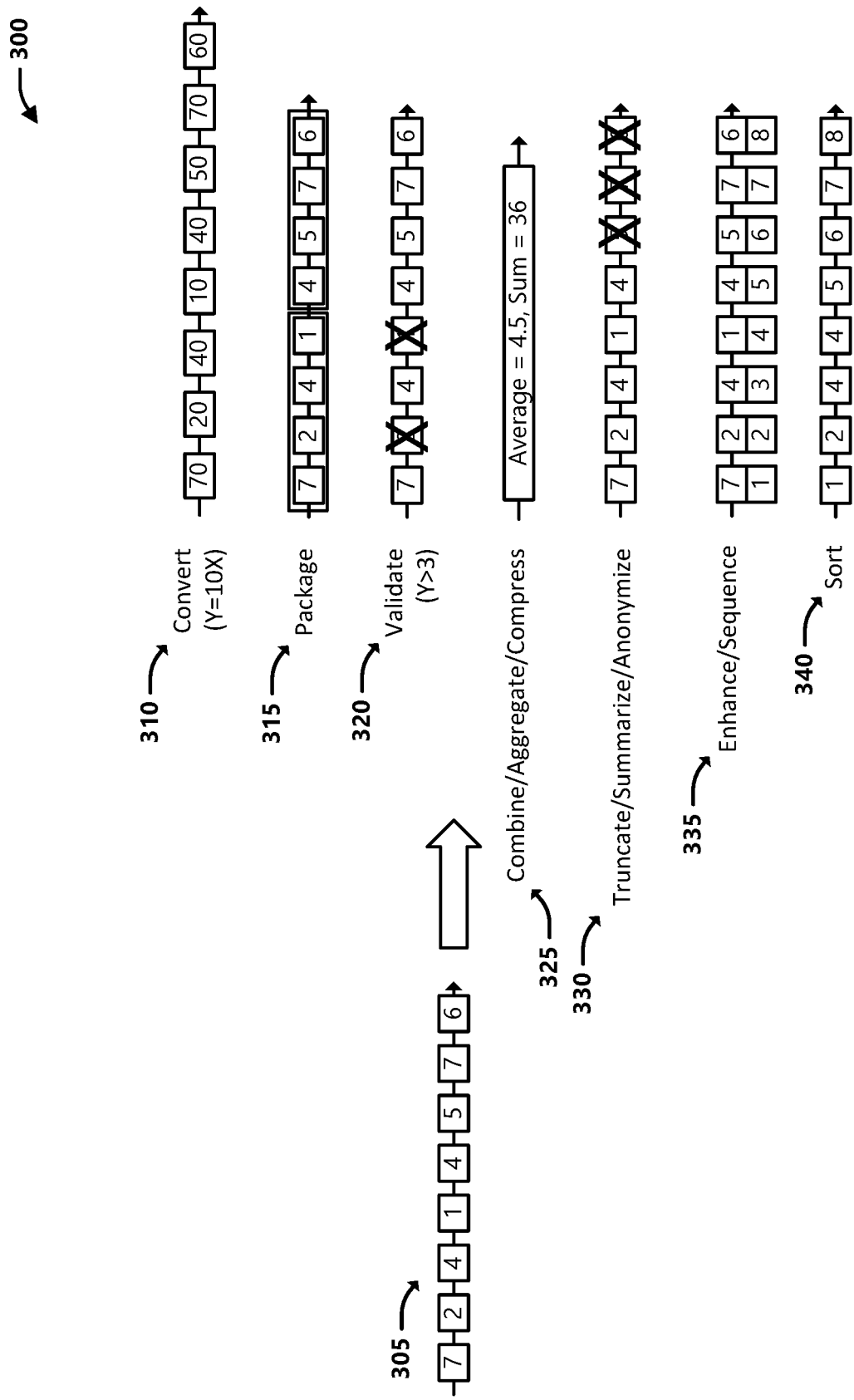
FIG. 3 is a block diagram illustrating example data processing operations according to an embodiment.

With reference now to FIG. 3, various example data processing operations are that may be performed by the data aggregator 220 are illustrated. For example, telemetry data 305 that are received by the telemetry convergence system 150 are depicted in FIG. 3 as a string of data, where each box may represent a data point, a data bit, a data byte, a data file, or other similar data container. For example, processing telemetry data 305 can include one or a combination of: converting the data, packaging the data, validating the data, combining the data, truncating the data, enhancing the data, and sorting the data, among other data processing operations. A first data processing example shows received telemetry 305 being converted 310 based on a prescribed function. For example, converting data can include changing file types, modification of the data by functions, changing the format of the data, etc. According to an example aspect, the data aggregator 220 may be configured to convert telemetry data 305 into a format utilized by a particular client decisioning system 140.

A second data processing example shows telemetry data 305 being packaged 315 into blocks containing a plurality of data points. For example, packaging data may allow for smaller parts of a data string to be transferred and stored at a faster rate than otherwise could be done with the entire data sting.

A third data processing example shows telemetry data 305 being validated 320 to ensure it adheres to a set of rules or requirements for the data. For example, the data aggregator 220 may be configured to validate data to ensure accuracy or structure according to a set of rules prior to publishing the data to a queue 245.

A fourth data processing example shows telemetry data 305 being combined, aggregated, and/or compressed 325. Combining data may allow for the data to be represented by fewer data points, thus making the overall size of the data smaller. In some examples no data are lost, such as in lossless compression; while in other examples, such as in the illustrated example, the data may be represented by another value, such as the average or the sum of a plurality of received data. For example, the data aggregator 220 may be configured to determine an average value of received telemetry data 305 (e.g., average temperature from a plurality of collected temperature readings in a particular area), and provide the average value to a client decisioning system 140.

A fifth data processing example shows telemetry data 305 being truncated, summarized, and/or anonymized 330. For example, certain data points may be truncated or culled from the data. These data points may not be utilized by a particular client decisioning system 140, and may be removed from the data prior to providing the data to the client. In an anonymization example, personal identifiable data may be removed from telemetry data 305 to allow for use of the data without compromising the identity of the telemetry source 130 or the owner of the telemetry source. In a summarization example, redundant data or data that may be determined as substantially similar may be removed from the data prior to publishing the data to a queue 245.

A sixth data processing example shows telemetry data 305 being enhanced and/or sequenced 335. In the example shown, a data identifying tag is added to the data. This tag can include identifiers such as metadata, device identification, timestamps, and sequence number, among other data identifiers. For example, a tag can be utilized as a cross-reference to find associated data.

The seventh data processing example shows telemetry data 305 being sorted 340. The example depicts the initial data 305 getting sorted into ascending order. Other sorting schemes can be implemented, such as descending order, odd-even, alpha-numeric, or based on a tag added in an enhancing operation 335, such as based on a timestamp, location, or telemetry source identifier. Another data processing example may include correlating various types of data for identifying characteristics of a location. For example, temperature points collected from various telemetry sources 130 may be plotted on a map, and the map may include topology and other physical characteristics (e.g., building material). The temperature points may be converted to temperature gradients for specific materials (e.g., which can show that roadways subject to certain elevations may have a certain temperature gradient over time different than water bodies or that an aerial plant open to direct sun may experience a temperature gradient different than shaded or underground plant components). Other types of data processing operations are possible and are within the scope of the present disclosure.

Figure 4A:
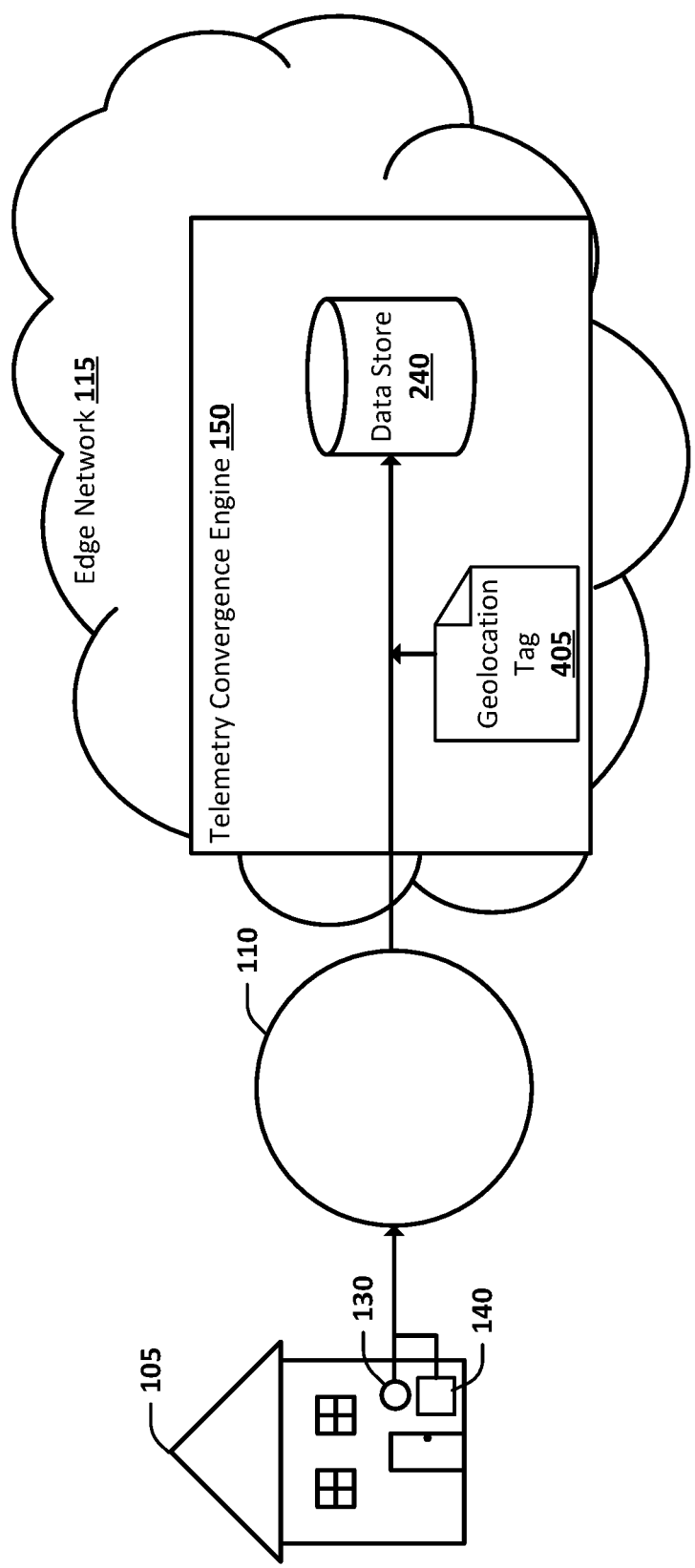
FIG. 4A is a block diagram illustrating an example of telemetry data receiving a metadata tag and being stored in a data lake in accordance with an embodiment.
Figure 4B:
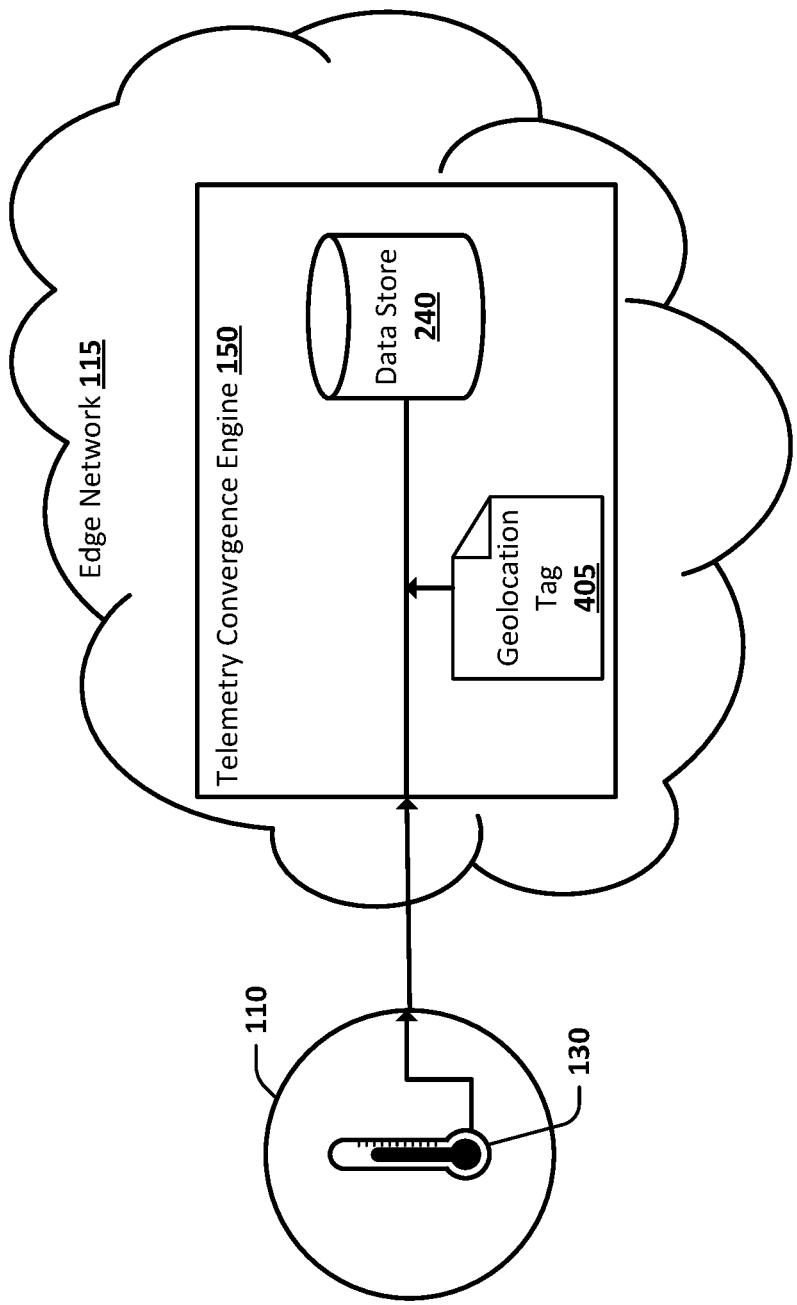
FIG. 4B is a block diagram illustrating another example of telemetry data receiving a metadata tag and being stored in a data lake in accordance with an embodiment.
Figure 4C:
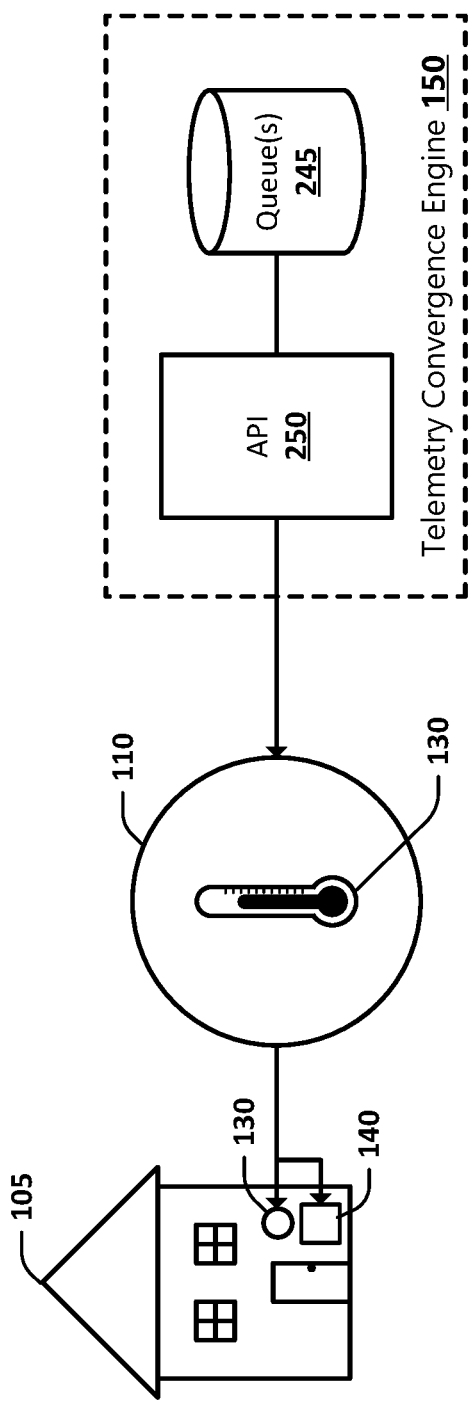
FIG. 4C is a block diagram illustrating a client decisioning system receiving edge-converged telemetry in accordance with an embodiment.

FIGS. 4A, 4B and 4C are block diagrams showing an example acquisition and convergence of local telemetry in an edge network 115. In FIG. 4A a telemetry source 130 at a client premises 105 is providing telemetry data to the telemetry convergence system 150. The telemetry source 130 may comprise one or more sensors. The telemetry source 130 may or may not be part of a client decisioning system 140. For example, the telemetry source 130 may be a source of data and not a user of the data that it collects. The telemetry data may be transmitted to the telemetry convergence system 150, which may be located in an edge network 115, wherein the data may be passed through one or more network nodes 110 to the telemetry convergence system. As described above, the telemetry convergence system 150 may utilize the geotagging engine 210 to assign a geolocation tag 405 to the telemetry data. In an example aspect, the geolocation tag 405 may include geolocation data corresponding to the geolocation of the telemetry source 130 or to the physical location of the node 110 that the telemetry source may connect to transmit telemetry to the telemetry convergence system 150. Further, the telemetry convergence system 150 may utilize the geotagging engine 210 to store the geo-tagged telemetry in the data store 240, which may be configured as a data lake.

With reference now to FIG. 4B, the telemetry source 130 of FIG. 4A is illustrated as a temperature sensor located at a node 110. For example, temperature data collected by the node temperature sensor may be transmitted from the node 110 to the telemetry convergence system 150 positioned at the edge network 115. In this example, the geolocation tag 405 assigned to the telemetry data include the geolocation of the node 110. For example, the geotagging engine 210 may access the network topology database 230 to determine the geolocation of the node 110 based on network routing information associated with the telemetry data message.

FIG. 4C depicts an example use of the node temperature data by a client decisioning system 140 at a client premises 105. For example, the client decisioning system 140 may transmit a request to the telemetry convergence system 150 (e.g., via an API 250) for edge-converged telemetry, or the telemetry convergence system may push edge-converged telemetry to the client decisioning system based on subscription settings. Based on the client's subscription or request, the node temperature data provided by the node sensor may be determined as relevant to the client decisioning system 140. For example, based on the telemetry meeting certain criteria or having certain attributes (e.g., location, telemetry data type, age of data), the data aggregator 220 may correlate and converge the node temperature data with other local temperature-related telemetry, and may publish the converged telemetry to a queue 245 to which the client subscribes or provide the converged telemetry in a response to a request for the data.

In one example, the client decisioning system 140 may query the queue 245 for telemetry data that has been published to that queue, and the relevant data may be anonymized (e.g., by the data anonymizer 215), and then transmitted to the client. In another example, the telemetry data published to the queue 245 (e.g., including the node temperature data) may be anonymized and then pushed to the client decisioning system 140 (e.g., in real-time or near real-time as the data are published to the queue or in a periodic push of data). Or in another example, the client decisioning system 140 may query the data aggregator 220 for edge-converged telemetry, and the data may be provided to the client in a response.

Figure 5:
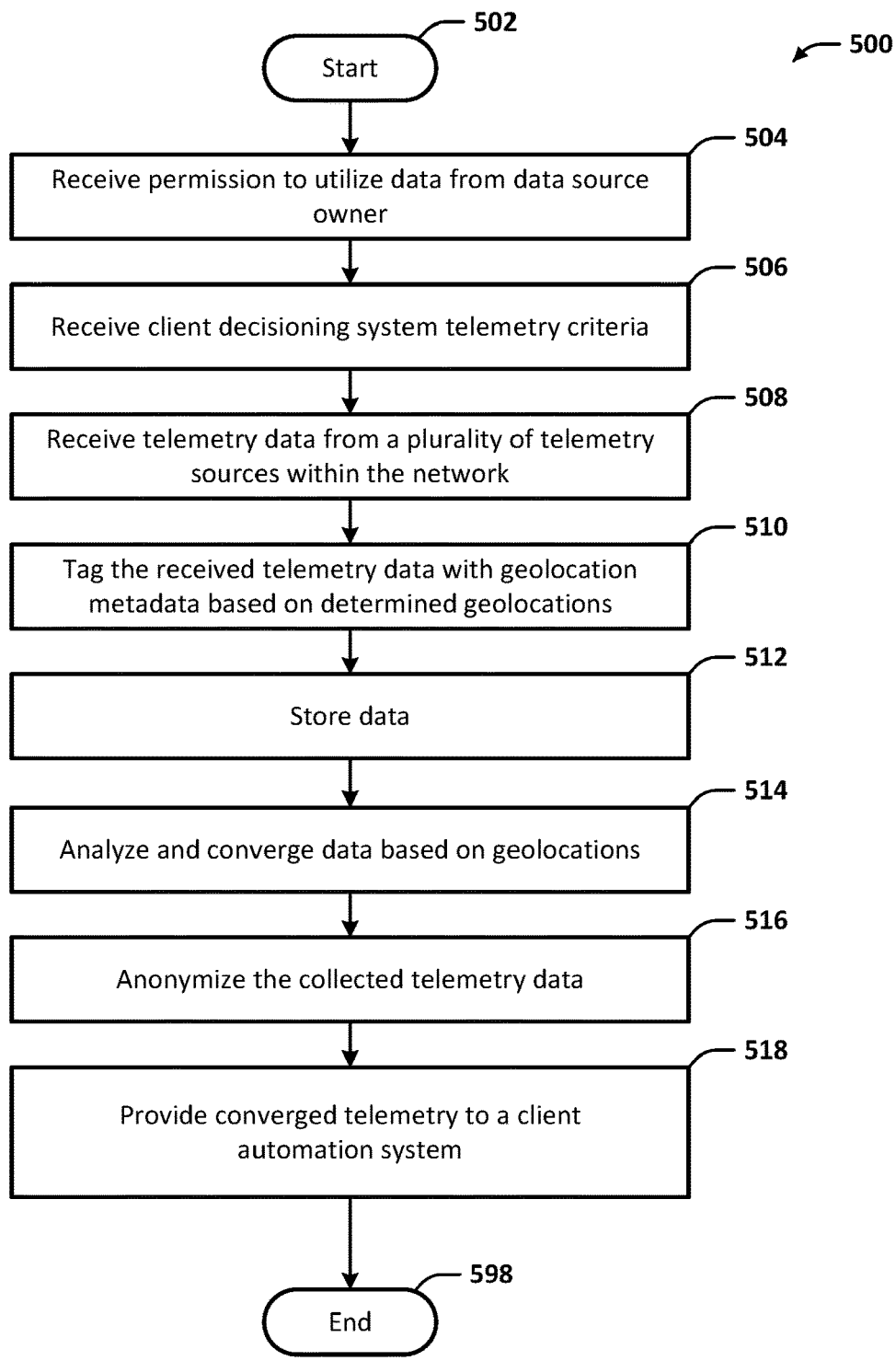
FIG. 5 is a flow diagram depicting general stages of an example process for providing edge-converged telemetry in accordance with some embodiments.

FIG. 5 is a flow diagram depicting general stages of an example process 500 for providing locally-relevant telemetry data to a client decisioning system 140 in accordance with an embodiment. The method 500 starts at OPERATION 502 and proceeds to OPERATION 504 where the method uses the telemetry data collector 205 to configure at least one telemetry source 130 as a source of telemetry data for the telemetry convergence system 150. For example, the configuration may be associated with an owner of a telemetry source 130 registering the telemetry source with the telemetry convergence system 150. In an example aspect, as part of configuring a telemetry source 130 as a source of telemetry data, the telemetry convergence system 150 may expose an API that enables the telemetry source 130 to publish telemetry collected and output by one or more sensors of the telemetry source 130 to the telemetry convergence system 150. In another example aspect, as part of configuring a telemetry source 130 as a source of telemetry data, the telemetry source may be registered to publish telemetry to a third-party platform, wherein as part of the registration, the owner of the telemetry source may give permission for the third-party platform to share published telemetry with other systems, such as the telemetry convergence system 150.

At OPERATION 506, the method 500 may use the data aggregator 220 to receive client decisioning system 140 telemetry criteria. In some examples, the data aggregator 220 may receive a query request for edge-converged telemetry, wherein the query may define criteria of the telemetry that it wants to receive. In other examples, the data aggregator 220 may receive subscription settings associated with the client decisioning system 140 that define criteria or attributes of telemetry that the client system is subscribing to receive. For example, subscription settings may define a location, telemetry data type, age of data, notification settings, etc. The query request or subscription settings may be based on one or more functionalities provided by the client decisioning system 140. For example, subscription settings may define criteria (e.g., location, telemetry data type, age of data, alerts) used by the client decisioning system 140 to make a decision or that the client monitors as part of providing an automation functionality. In an example aspect, the telemetry convergence system 150 may generate one or more telemetry data queues 245 based on the subscription settings, and may configure the one or more queues to enable the client decisioning system 140 to push data to or pull data from the one or more queues. The telemetry convergence system 150 may expose an API 250 via which the client decisioning system is enabled to interface the data aggregator for accessing telemetry data (e.g., via an API call).

At OPERATION 508, the method 500 may use the telemetry data collector 205 to receive telemetry data from one or a plurality of telemetry sources 130 in the network 100. These data can be received over wired and/or wireless means, and in some example, can be received via an API call to a third-party system. Telemetry data may be provided to the telemetry convergence system 150 in real-time or near real-time (e.g., as the data are collected by the one or more telemetry sources 130), in a periodic push/pull of data from the one or more sources, or responsive to a request for telemetry based on a client decisioning system request for edge-converged telemetry. As described above, telemetry may be sensed and provided by a telemetry source 130 located at a network node 110 in the edge network 115 and/or by a telemetry source communicatively connected to a node.

At OPERATION 510, the method 500 may use the geotagging engine 210 to determine a geolocation associated with received telemetry data, and to assign geolocation metadata (e.g., a geolocation tag 405) based on the determined geolocation. For example, geotagging engine 210 may inspect a telemetry data packet for network addressing information, and may reference a network topology table stored in the network topology database 230 to determine the geolocation of the telemetry. The geolocation tag 405 may include the physical location of the telemetry source 130 and/or the network node 110 via which the telemetry are transmitted to the network 115 by the telemetry source 130.

At OPERATION 512, the geo-tagged telemetry may be stored in a data store 240, such as a data store configured as a data lake that may be accessed by other components of the telemetry convergence system 150.

At OPERATION 514, the method 500 may use the data aggregator 220 to analyze the geo-tagged telemetry for determining whether attributes of the data match criteria associated with the client decisioning system's request or subscription settings. In an example aspect, the data aggregator 220 may analyze geo-tagged telemetry for determining whether the data are locally-relevant to the client decisioning system 140 based on the geolocation tag 405 and based on the location of the client (e.g., based on network topology data, defined in the request or subscription settings, included in user profile data). Further, the data aggregator 220 may analyze the geo-tagged telemetry data for determining whether the data are associated with a data type that the client decisioning system 140 is requesting or is subscribed to receive. For example, the data type may be associated with a decision and/or functionality provided by the client. Further, the data aggregator 220 may correlate geo-tagged telemetry with other data points gathered from within the edge network 115 based on the geolocation and telemetry data type. The data aggregator 220 may further converge correlated telemetry. In some examples, the data aggregator 220 may use the prediction engine 225 to analyze the telemetry data for calculating the probability that an event will occur based on historical data. When an event is predicted, the data aggregator 220 may determine whether the predicted event is relevant to the client decisioning system 140 (e.g., based on the location of the client decisioning system, the client request, or subscription settings).

At OPERATION 516, the method 500 may use the anonymizer 215 to anonymize the edge-converged telemetry data prior to the data being transmitted to the client decisioning system 140. For example, anonymizing the data may remove identifying information associated with the telemetry source 130.

At OPERATION 518, the method 500 may use the data aggregator 220 to provide the edge-converged telemetry to the client decisioning system 140. In some examples, the data aggregator 220 may publish the edge-converged telemetry to a data queue 245 subscribed to by the client decisioning system 140, wherein data published to the queue may be pushed to the client or pulled by the client in a request. In other examples, the data aggregator may respond to a client request for edge-converged telemetry with the edge-converged telemetry determined to be relevant to the client based on the request. In some examples, at OPERATION 518, the method 500 may use the API 250 to interface the client decisioning system 140 for providing edge-converged telemetry to the client. According to an example aspect, the telemetry data provided to the client decisioning system 140 may be truncated such that data that are not of a specific requested type or that are not locally-relevant to the client decisioning system 140 are not published the that client's telemetry data queue 245 and/or are not transmitted to the client. For example, rather than providing the client decisioning system 140 access to a data stream of telemetry data provided by various telemetry sources 130, the data provided to the client may first be analyzed, correlated, and converged with data collected from other telemetry sources 130 in the edge network 115. In an example aspect, the edge-converged telemetry may additionally be summarized, enhanced, sequenced, sorted, etc., as described above with reference to FIG. 3. The method 500 ends at OPERATION 598.

A computer readable storage device may include executable instructions which, when executed by one or more processors, receive telemetry data from a plurality of telemetry sources, determine geolocations associated with the received telemetry data based on the telemetry sources or nodes through which the data are transmitted, and tags the received telemetry data with geolocation metadata. The instructions, which when executed by one or more processors, may further store the data in a data store 240, analyze the data for publishing to one or more data queues 245, anonymize the data, and transmit the data to one or more client decisioning systems 140 for providing locally-relevant anonymized telemetry data to one or more services that are configured to provide functionalities supported by local telemetry-based decisions.

Figure 6:
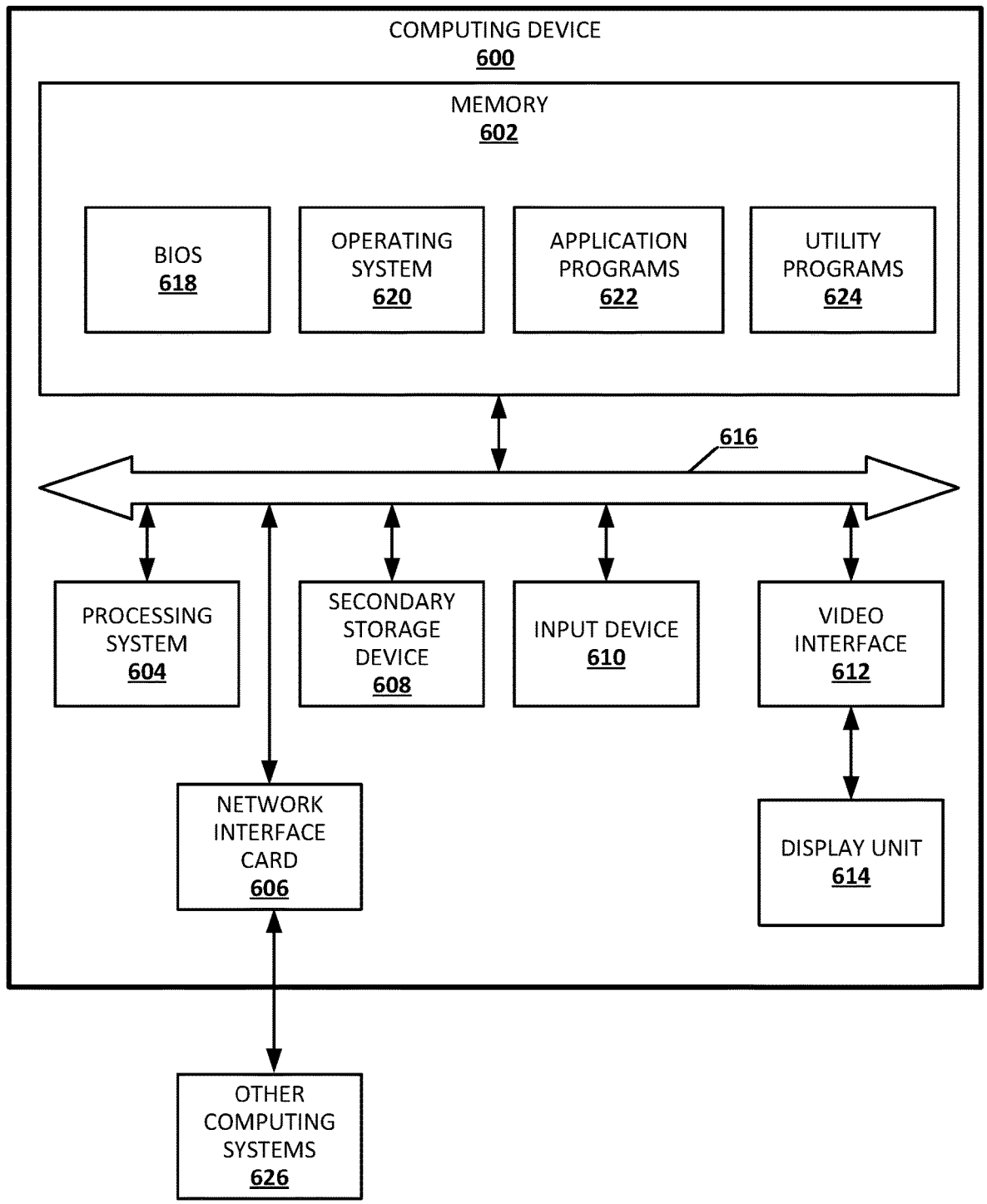
FIG. 6 is a block diagram illustrating example physical components of a computing device or system with which embodiments may be practiced.

FIG. 6 is a block diagram illustrating example physical components of a computing device or system 600 with which embodiments may be practiced. It should be appreciated that in other embodiments, different hardware components other than those illustrated in the example of FIG. 6 may be used. Computing devices may be implemented in different ways in different embodiments. For instance, in the example of FIG. 6, the computing device 600 includes a processing system 605, memory 602, a network interface 606 (wired and/or wireless), a secondary storage device 608, an input device 610, a video interface 612, a display unit 615, and a communication medium 616. In other embodiments, the computing device 600 may be implemented using more or fewer hardware components (e.g., a video interface, a display unit, or an input device) or in combination with other types of computer systems and program modules 626.

The memory 602 includes one or more computer-readable storage media capable of storing data and/or computer-executable instructions. Memory 602 may store the computer-executable instructions that, when executed by processor 605, provide the telemetry convergence system 150 according to an embodiment. In various embodiments, the memory 602 is implemented in various ways. For example, the memory 602 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

The processing system 605 includes one or more processing units, which may include tangible integrated circuits that selectively execute computer-executable instructions. In various embodiments, the processing units in the processing system 605 are implemented in various ways. For example, the processing units in the processing system 605 can be implemented as one or more processing cores. In this example, the processing system 605 can comprise one or more microprocessors. In another example, the processing system 605 can comprise one or more separate microprocessors. In yet another example embodiment, the processing system 605 can comprise Application-Specific Integrated Circuits (ASICs) that provide specific functionality. In yet another example, the processing system 605 provides specific functionality by using an ASIC and by executing computer-executable instructions.

The computing device 600 may be enabled to send data to and receive data from a communication network via a network interface card 606. In different embodiments, the network interface card 606 is implemented in different ways, such as an Ethernet interface, a token-ring network interface, a fiber optic network interface, a wireless network interface (e.g., WIFI, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 608 includes one or more computer-readable storage media, and may store data and computer-executable instructions not directly accessible by the processing system 605. That is, the processing system 605 performs an I/O operation to retrieve data and/or computer-executable instructions from the secondary storage device 608. In various embodiments, the secondary storage device 608 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 610 enables the computing device 600 to receive input from a user. Example types of input devices include, but are not limited to, keyboards, mice, trackballs, stylus input devices, key pads, microphones, joysticks, touch-sensitive display screens, and other types of devices that provide user input to the computing device 600.

The video interface 612 outputs video information to the display unit 615. In different embodiments, the video interface 612 is implemented in different ways. For example, the video interface 612 is a video expansion card. In another example, the video interface 612 is integrated into a motherboard of the computing device 600. In various embodiments, the display unit 615 can be an LCD display panel, a touch-sensitive display panel, an LED screen, a projector, a cathode-ray tube display, or another type of display unit. In various embodiments, the video interface 612 communicates with the display unit 615 in various ways. For example, the video interface 612 can communicate with the display unit 615 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 616 facilitates communication among the hardware components of the computing device 600. In different embodiments, the communications medium 616 facilitates communication among different components of the computing device 600. For instance, in the example of FIG. 6, the communications medium 616 facilitates communication among the memory 602, the processing system 605, the network interface card 606, the secondary storage device 608, the input device 610, and the video interface 612. In different embodiments, the communications medium 616 is implemented in different ways, such as a PCI bus, a PCI Express bus, an accelerated graphics port (AGP) bus, an InfiniBand® interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 602 stores various types of data and/or software instructions. For instance, in the example of FIG. 6, the memory 602 stores a Basic Input/Output System (BIOS) 618, and an operating system 620. The BIOS 618 includes a set of software instructions that, when executed by the processing system 605, cause the computing device 600 to boot up. The operating system 620 includes a set of software instructions that, when executed by the processing system 605, cause the computing device 600 to provide an operating system that coordinates the activities and sharing of resources of the computing device 600. The memory 602 also stores one or more application programs or program code 622 that, when executed by the processing system 605, cause the computing device 600 to provide applications to users. The memory 602 also stores one or more utility programs 625 that, when executed by the processing system 605, cause the computing device 600 to provide utilities to other software programs.

Embodiments may be used in combination with any number of computer systems, such as in server environments, desktop environments, laptop or notebook computer systems, multiprocessor systems, micro-processor based or programmable consumer electronics, networked PCs, mini computers, main frame computers and the like. Embodiments may be utilized in various distributed computing environments where tasks are performed by remote processing devices that are linked through a communications network in a distributed computing environment, and where program code may be located in local and/or remote memory storage (e.g., memory and/or disk(s)).

All system components described herein may be communicatively coupled via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPoE), etc. including any combination thereof.

Figure 7:
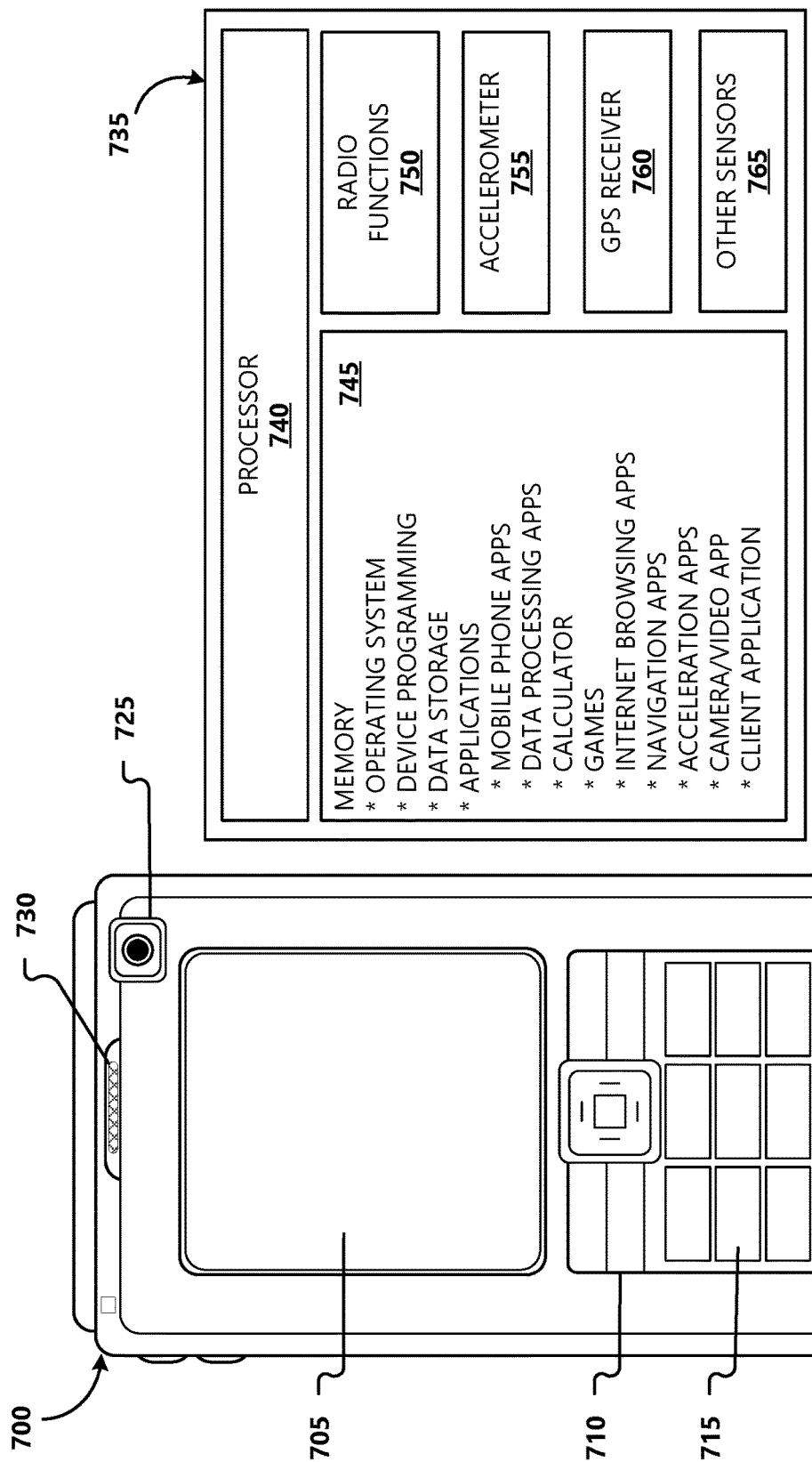
FIGS. 7A and 7B are block diagrams illustrating example physical components of a suitable mobile computing environment with which aspects of the present disclosure can be practiced.

FIGS. 7A-7B illustrate a suitable mobile computing device 700 or environment, for example, a mobile computing device or smart phone, a tablet personal computer, a laptop computer, or other user device, with which aspects can be practiced. The mobile computing device 700 is illustrative of any suitable device operative to send, receive and process wireless communications. A display screen 705 is operative for displaying a variety of information such as information about incoming and outgoing communications, as well as, a variety of data and displayable objects, for example, text, alphanumeric data, photographs, and the like.

Data input to the mobile computing device 700 can be performed via a variety of suitable means, such as, touch screen input via the display screen 705, keyboard or keypad input via a data entry area 710, key input via one or more selectable buttons or controls 715, voice input via a microphone 718 disposed on the mobile computing device 700, biometric input via a biometric sensor 720 disposed on the mobile computing device 700, photographic input via a camera 725 functionality associated with the mobile computing device 700, or any other suitable input means. Data can be output via the mobile computing device 700 via any suitable output means, including but not limited to, display on the display screen 705, audible output via an associated speaker 730 or connected earphone system, vibration module for providing tactile output, and the like.

Referring now to FIG. 7B, operational unit 735 is illustrative of internal operating functionality of the mobile computing device 700. A processor 740 is illustrative of a computer processor for processing incoming and outgoing data and communications and controlling operation of the device and associated software applications via a mobile computing device operating system. Memory 745 can be utilized for storing a device operating system, device programming, one or more stored applications, for example, mobile telephone applications, data processing applications, calculators, games, Internet browsing applications, navigation applications, acceleration applications, camera and/or video applications, etc.

Mobile computing device 700 can contain an accelerometer 755 for detecting acceleration, and can be used to sense orientation, vibration, and/or shock. Mobile computing device 700 can contain a global positioning system (GPS) system (e.g., GPS send/receive functionality) 760. A GPS system 760 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 750 include all required functionality, including onboard antennae, for allowing the mobile computing device 700 to communicate with other communication devices and systems via a wireless network. Radio functions 750 can be utilized to communicate with a wireless or WIFI-based positioning system to determine a device location. Other sensors 765 can also be utilized to perform a plurality of additional functions. These sensors include gyroscopic sensors, ambient light sensors, proximity sensors, magnetometers, barometers, thermometers, air humidity sensors, radiation sensors, laser sensors, etc.

Figure 8:
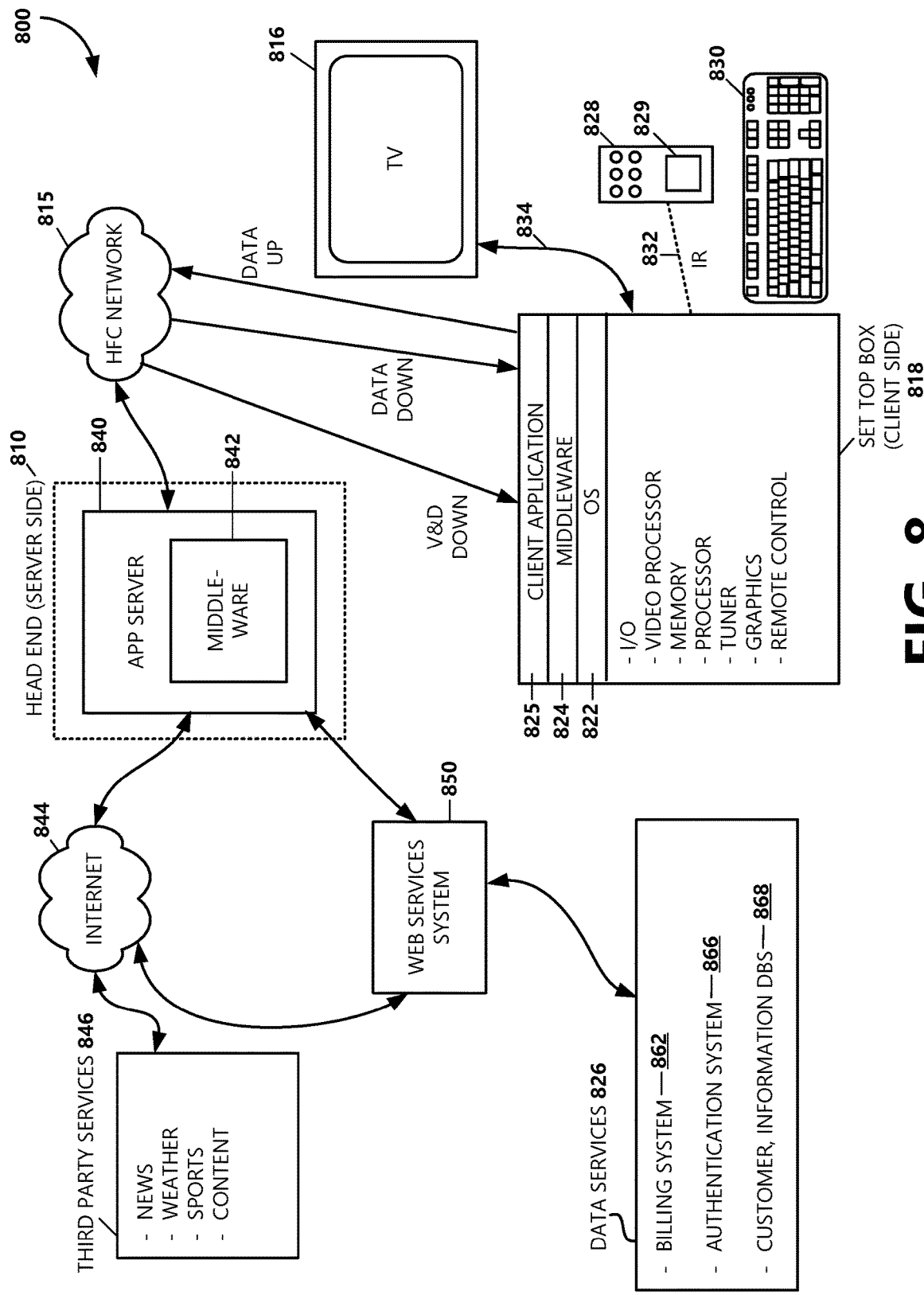
FIG. 8 is a block diagram illustrating components of a cable services system architecture providing an example operating environment according to aspects of the present disclosure.

FIG. 8 is a block diagram illustrating a cable television services system 800 (hereafter referred to as "CATV")

architecture providing an operating environment according to an aspect. The CATV architecture is an example network that the above embodiments may be practiced on. Referring now to FIG. 8, digital and analog video programming, information content, and interactive television services are provided via a hybrid fiber-coaxial (HFC) network 815 to a television set 816 for consumption by a cable television/services system customer. As is known to those skilled in the art, HFC networks 815 combine both optical fiber and coaxial cable lines. Typically, optical fiber runs from the cable head end 810 to neighborhoods of subscribers. Coaxial cable runs from the optical fiber feeders to each customer or subscriber. The functionality of the HFC network 815 allows for efficient bidirectional data flow between the set-top box 818 and the application server 840 of the aspect.

The CATV system 800 is in the form of a distributed client-server computing system for providing video and data flow across the HFC network 815 between server-side services providers (e.g., cable television/services providers) via a server-side head end 810 and a client-side customer via a set-top box (STB) 818 functionally connected to a customer receiving device, such as the television set 816. As is understood by those skilled in the art, modern CATV systems 800 can provide a variety of services across the HFC network 815 including traditional digital and analog video programming, telephone services, high speed Internet access, video-on-demand, and other services.

On the client side of the CATV system 800, digital and analog video programming and digital and analog data are provided to the customer television set 816 via the STB 818. Interactive television services that allow a customer to input data to the CATV system 800 likewise are provided by the STB 818. As illustrated in FIG. 8, the STB 818 is a multipurpose computing device having a computer processor, memory, and an input/output mechanism. The input/output mechanism receives input from server-side processes via the HFC network 815 and from customers via input devices such as a remote control device 828, keyboard 830, or other computing device, such as a tablet/slate computer, smart phone, etc. The remote control device 828 and the keyboard 830 can communicate with the STB 818 via a suitable communication transport such as the infrared connection 832. The remote control device 828 can include a biometric input module 829. The STB 818 also includes a video processor for processing and providing digital and analog video signaling to the television set 816 via a cable communication transport 834. A multi-channel tuner is provided for processing video and data to and from the STB 818 and the server-side head end system 810, described below.

The STB 818 also includes an operating system 822 for directing the functions of the STB 818 in conjunction with a variety of client applications 825. For example, if a client application 825 requires a news flash from a third-party news source to be displayed on the television 816, the operating system 822 can cause the graphics functionality and video processor of the STB 818, for example, to output the news flash to the television 816 at the direction of the client application 825 responsible for displaying news items.

Because a variety of different operating systems 822 can be utilized by a variety of different brands and types of set-top boxes 818, a middleware layer 824 can be provided to allow a given software application to be executed by a variety of different operating systems. According to an embodiment, the middleware layer 824 can include a set of application programming interfaces (APIs) that are exposed to client applications and operating systems 822 that allow client applications 825 to communicate with the operating systems 822 through common data calls understood via the API set. As described below, a corresponding middleware layer 842 is included on the server side of the CATV system 800 for facilitating communication between the server-side application server and the client-side STB 818. The middleware layer 842 of the server-side application server and the middleware layer 824 of the client-side STB 818 can format data passed between the client side and server side according to the Extensible Markup Language (XML).

According to one aspect, the STB 818 passes digital and analog video and data signaling to the television 816 via a one-way communication transport 834. According to other aspects, two-way communication transports can be utilized, for example, via high definition multimedia (HDMI) ports. The STB 818 can receive video and data from the server side of the CATV system 800 via the HFC network 815 through a video/data downlink and data via a data downlink. The STB 818 can transmit data from the client side of the CATV system 800 to the server side of the CATV system 800 via the HFC network 815 via one data uplink. The video/data downlink is an "in band" downlink that allows for digital and analog video and data signaling from the server side of the CATV system 800 through the HFC network 815 to the STB 818 for use by the STB 818 and for distribution to the television set 816. As is understood by those skilled in the art, the "in band" signaling space operates at a relative high frequency, e.g., between 54 and 1000 megahertz. The signaling space is generally divided into 6 megahertz channels in which can be transmitted as a single analog signal or a greater number (e.g., ten) of digital signals.

The data downlink and the data uplink, illustrated in FIG. 8, between the HFC network 815 and the set-top box 818 comprise "out of band" data links. As is understand by those skilled in the art, the "out of band" frequency range is generally at a lower frequency than "in band" signaling. For example, the "out of band" frequency range can be between zero and 54 megahertz. Data flow between the STB 818 and the server-side application server 840 is typically passed through the "out of band" data links. Alternatively, an "in band" data carousel can be positioned in an "in band" channel into which a data feed can be processed from the application server 840 through the HFC network 815 to the STB 818. Operation of data transport between components of the CATV system 800, described with reference to FIG. 8, is well known to those skilled in the art.

Referring still to FIG. 8, the head end 810 of the CATV system 800 is positioned on the server side of the CATV system and includes hardware and software systems responsible for originating and managing content for distributing through the HFC network 815 to client-side STBs 818 for presentation to customers. As described above, a number of services can be provided by the CATV system 800, including digital and analog video programming, interactive television services, telephone services, video-on-demand services, targeted advertising, and/or provision of supplemental content.

The application server 840 can be configured as a computing system operative to assemble and manage data sent to and received from the STB 818 via the HFC network 815. As described above, the application server 840 includes a middleware layer 842 for processing and preparing data from the head end 810 of the CATV system 800 for receipt and use by the client-side STB 818. For example, the application server 840 via the middleware layer 842 can obtain supplemental content from third-party services 846 via the Internet 844 for transmitting to a customer through the HFC network 815, the STB 818, and recording by a local or remote DVR. For example, content metadata from a third-party content provider service can be downloaded by the application server 840 via the Internet 844. When the application server 840 receives the downloaded content metadata, the middleware layer 842 can be utilized to format the content metadata for receipt and use by the STB 818. Therefore, content metadata can be sent and categorized based on the availability to the customer's program guide data.

According to one embodiment, data obtained and managed by the middleware layer 842 of the application server 840 is formatted according to the Extensible Markup Language and is passed to the STB 818 through the HFC network 815 where the XML-formatted data can be utilized by a client application 825 in concert with the middleware layer 824, as described above. As should be appreciated by those skilled in the art, a variety of third-party services data 846, including news data, weather data, sports data and other information content can be obtained by the application server 840 via distributed computing environments such as the Internet 844 for provision to customers via the HFC network 815 and the STB 818.

According to aspects, the application server 840 obtains customer support services data, including billing data, information on customer work order status, answers to frequently asked questions, services provider contact information, and the like from data services 826 for provision to the customer via an interactive television session. The data services 826 include a number of services operated by the services provider of the CATV system 800 which can include profile and other data associated with a given customer.

A billing system 862 can include information such as a customer's name, street address, business identification number, Social Security number, credit history, and information regarding services and products subscribed to by the customer. According to embodiments, the billing system 862 can also include billing data for services and products subscribed to by the customer for bill processing, billing presentment and payment receipt.

A customer information database 868 can include general information about customers such as place of employment, business address, business telephone number, and demographic information such as age, gender, educational level, and the like. The customer information database 868 can also include information on pending work orders for services or products ordered by the customer. The customer information database 868 can also include general customer information such as answers to frequently asked customer questions and contact information for various service provider offices/departments. As should be understood, this information can be stored in a variety of disparate databases operated by the cable services provider.

Referring still to FIG. 8, web services system 850 is illustrated between the application server 840 and the data services 826. According to aspects, web services system 850 serves as a collection point for data requested from each of the disparate data services systems comprising the data services 826. According to aspects, when the application server 840 requires customer services data from one or more of the data services 826, the application server 840 passes a data query to the web services system 850. The web services system 850 formulates a data query to each of the available data services systems for obtaining any required data for a requesting customer as identified by a set-top box identification associated with the customer.

The web services system 850 serves as an abstraction layer between the various data services systems and the application server 840. That is, the application server 840 is not required to communicate with the disparate data services systems, nor is the application server 840 required to understand the data structures or data types utilized by the disparate data services systems. The web services system 850 is operative to communicate with each of the disparate data services systems for obtaining necessary customer data. The customer data obtained by the web services system is assembled and is returned to the application server 840 for ultimate processing via the middleware layer 842, as described above. An authentication system 866 can include information such as secure user names, subscriber profiles, subscriber IDs, and passwords utilized by customers for access to network services. As should be understood by those skilled in the art, the disparate systems 850, 862, 866, 868 can be integrated or provided in any combination of separate systems, wherein FIG. 8 shows one example.

Figure 9:
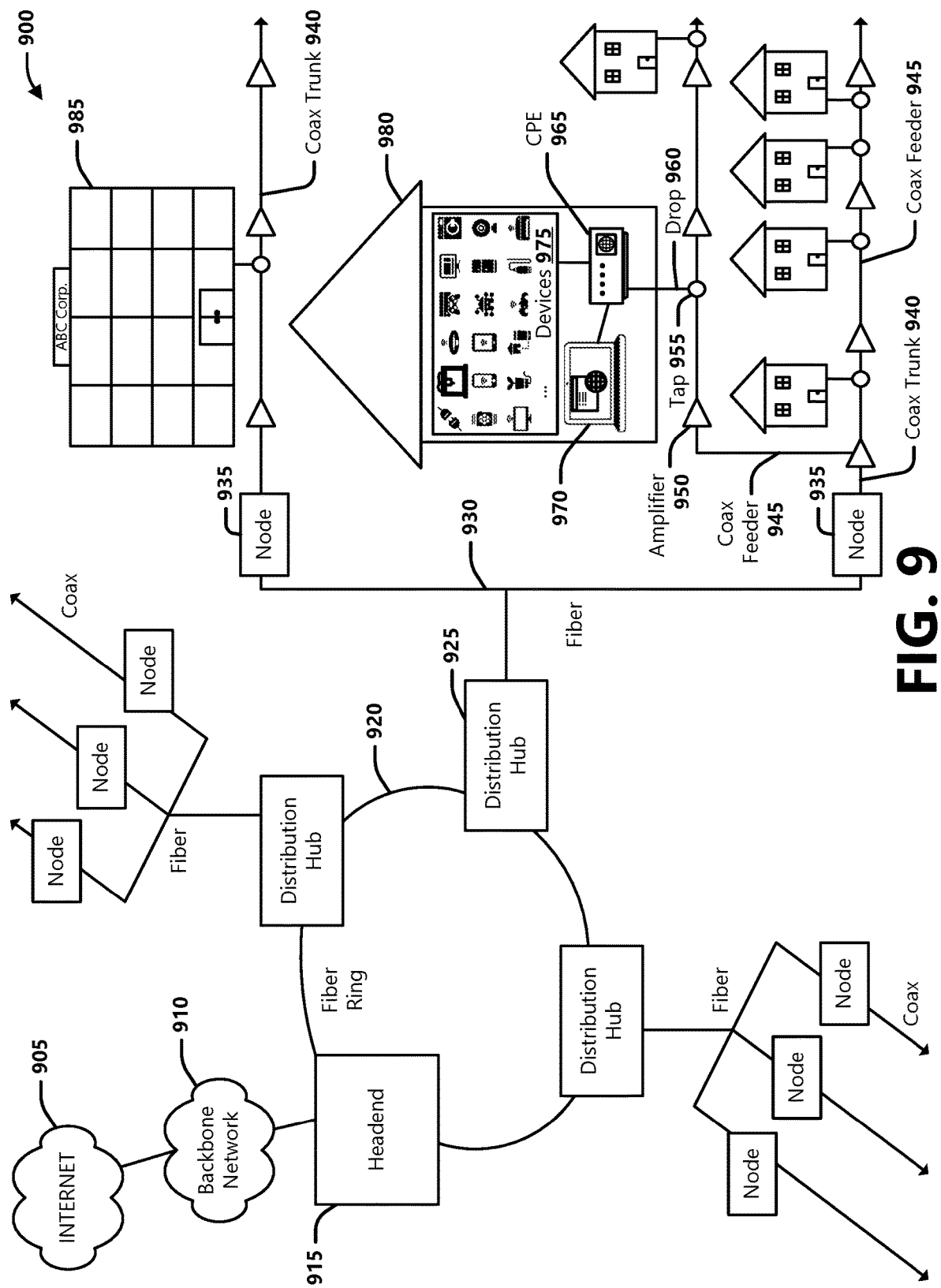
FIG. 9 is a block diagram illustrating components of a hybrid fiber-coaxial (HFC) broadband network architecture providing an example operating environment according to aspects of the present disclosure.

FIG. 9 is a block diagram representing a hybrid fiber-coaxial (HFC) network 900 provided by a service provider, such as an Internet Service Provider (ISP) to allow client devices 975 and client computing devices 970 located at client premises, such as homes 980 and businesses 985, to communicate with the Internet 905. The HFC network 900 is an example network on which the above embodiments can be practiced. Data signals from the Internet 905 may be received at the service provider headend 915 via a backbone network 910. The headend 915 can communicate with the backbone network 910 via satellite antennas, high capacity fiber-optic cables, broadband antennas, microwave antennas, etc. The headend 915 may act as a master facility wherein data flowing between the Internet 905 and the HFC network 900 passes through the facility.

A fiber-optic transport ring 920 may connect the headend 915 to a plurality of distribution hubs 925. The fiber-optic ring 920 may provide for a redundant connection between the distribution hubs 925 and the headend 915. The distribution hubs 925 are in communication with a plurality of optical nodes 935 via fiber-optic cabling 930. The optical nodes 935 are typically positioned within about 25 miles of the distribution hub 925 with which the node 935 is associated. The optical nodes 935 may typically serve up to a few thousand customer premises (980, 985). The optical nodes 935 may convert the data signals between fiber-optic light signals and coaxial (coax) electrical signals. Data from the nodes 935 may be output onto a coax cable trunk 940 and then spit off onto coax feeder cables 945.

A plurality of customer premises (980, 985) may be connected to the coax trunk 940 or the coax feeder 945 via a tap 955 and a drop 960. In order to maintain the necessary signal strength, a plurality of amplifiers 950 are utilized at various locations along the coax trunks 945 and the coax feeders 945. At each premises (980, 985) a customer premises equipment (CPE) device 965 is used as a gateway between the HCF network 900 and a local network created by the CPE device 965 for the premises (980, 985). The CPE device 965, for example, can either be provided by the service provider or by the client device user, and can include set-top boxes, modems, routers, gateways, or other devices. A user can utilize a client computing device 970 to access the Internet 905 as well as modify the local network settings of the CPE 965. A plurality of devices 975 can connect to the local network provided by the CPE 965 via WIFI, Ethernet, BLUETOOTH or other means of data connections. Other devices 975 can include printers, 3D printers, gaming systems, televisions, smart appliances, smart vehicles, security systems, wearable technologies, smartphones, tablet computer, and personal computers among other devices.

Aspects, for example, are described above with reference to block diagrams and/or operational illustrations of methods, systems, and computer program products according to embodiments. The functions/acts noted in the blocks can occur out of the order as shown in any flowchart or described herein. For example, two processes shown or described in succession can in fact be executed substantially concurrently or the blocks can sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media. Further, the disclosed processes may be modified in any manner, including by reordering and/or inserting or deleting a step or process, without departing from the embodiments.

The foregoing description has been presented for the purposes of illustration and description. It is not intended to be exhaustive or to limit the embodiments to the precise forms disclosed. Many modifications and variations are possible in light of the above teaching. It is intended that the scope of the invention be limited not with this detailed description, but rather by the claims appended hereto.

We claim:

1. A system comprising:
a communication network including an edge network; and
a telemetry convergence system to:
collect telemetry data associated with a plurality of telemetry data sources;
associate geolocation information with the collected telemetry data;
identify relevant telemetry data from the collected telemetry data according to the geolocation information for a local telemetry-based decision of at least one client; and
transmit the relevant telemetry data to the at least one client for the local telemetry-based decision.

2. The system of claim 1, the telemetry convergence system further to:
determine the geolocation information based in part on one or more geolocations of one or more network elements of the communication network through which the telemetry data are communicated; and
associate the geolocation information of the one or more network elements the collected telemetry.

3. The system of claim 1, the telemetry convergence system further to determine the relevant telemetry data based on the geolocation of a network node with respect to the at least one client.

4. The system of claim 1, the telemetry convergence system further to identify local sources of telemetry associated with the at least one client.

5. The system of claim 1, the telemetry convergence system further to identify the relevant telemetry data from the collected telemetry data based on a type of telemetry data and/or a type of client.

6. The system of claim 1, the telemetry convergence system further to anonymize the relevant telemetry data before transmission of the relevant telemetry data to the at least one client.

7. The system of claim 1, the telemetry convergence system further to source the relevant telemetry data from outside a local network of the at least one client.

8. The system of claim 1, the telemetry convergence system further to receive registration data associated with one or more of the plurality of telemetry sources contributing to the collected telemetry data.

9. The system of claim 1, the telemetry convergence system further to receive one or more of: an identifier of each telemetry source, an identifier of each sensor, an identifier of a telemetry data type associated with each telemetry source.

10. The system of claim 1, the telemetry convergence system further to receive an identifier and/or a time-date stamp associated with each relevant telemetry source.

11. The system of claim 1, the telemetry convergence system further to inspect one or more telemetry data packets may include a shallow packet inspection that identifies network addressing information included in one or more of the telemetry data packets.

12. The system of claim 1, the telemetry convergence system further to determine the geolocation information of a network node or a client router as a source node of a telemetry data packet.

13. A method of collecting telemetry data for local telemetry-based decisions comprising:
collecting telemetry data associated with a plurality of telemetry data sources;
associating geolocation information with the collected telemetry data;
identifying relevant telemetry data from the collected telemetry data according to the geolocation information for a local telemetry-based decision of at least one client;
anonymizing the relevant telemetry data; and
transmitting the anonymized relevant telemetry data to the at least one client for the local telemetry-based decision.

14. The method of claim 13, further comprising determining the geolocation information of a network node or a client router as a source node of a telemetry data packet.

15. The method of claim 13, further comprising identifying the relevant telemetry data from the collected telemetry data based on a type of telemetry data and/or a type of client.

16. The method of claim 13, further comprising sourcing the relevant telemetry data from outside a local network of the at least one client.

17. The method of claim 13, further comprising predicting one or more events based in part on the collected telemetry data.

18. System comprising:
a local network; and
a client device coupled to the local network, the client device to:
receive relevant telemetry data via the local network, wherein the relevant telemetry data was collected from a plurality of telemetry data sources and identified as being relevant according to geolocation information associated with each of the plurality of telemetry data sources; and
determine whether to execute a telemetry-based decision according to the relevant telemetry data received via the local network.

19. The system of claim 18, wherein the client device is further to receive anonymized relevant telemetry data.

20. The system of claim 18, wherein the client device operates as part of an automation system that utilizes the relevant telemetry data to control one or more devices coupled to the local network.

* * * * *